United States Patent
Das et al.

(10) Patent No.: US 9,014,721 B2
(45) Date of Patent: Apr. 21, 2015

(54) MOBILE DEVICE LOCATING IN CONJUNCTION WITH LOCALIZED ENVIRONMENTS

(71) Applicant: QUALCOMM Incorporated, San Diego, CA (US)

(72) Inventors: Saumitra Mohan Das, Santa Clara, CA (US); Ayman Fawzy Naguib, Cupertimo, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/072,747

(22) Filed: Nov. 5, 2013

(65) Prior Publication Data

US 2014/0066103 A1     Mar. 6, 2014

Related U.S. Application Data

(62) Division of application No. 12/895,583, filed on Sep. 30, 2010.

(60) Provisional application No. 61/247,865, filed on Oct. 1, 2009.

(51) Int. Cl.
*H04W 24/00*     (2009.01)
*G01C 21/20*     (2006.01)
(Continued)

(52) U.S. Cl.
CPC ................. *H04W 4/02* (2013.01); *G01C 21/20* (2013.01); *H04W 4/028* (2013.01); *H04W 4/021* (2013.01); *G01S 5/0036* (2013.01); *G01C 21/206* (2013.01); *H04W 4/043* (2013.01)

(58) Field of Classification Search
CPC ..... G01C 21/20; G01C 21/206; G01S 5/0036; H04W 4/021; H04W 4/028
USPC ............. 455/456.2, 456.3, 457; 701/434, 433
See application file for complete search history.

(56) References Cited

U.S. PATENT DOCUMENTS

| 6,047,234 | A | 4/2000 | Cherveny et al. |
| 6,259,405 | B1 | 7/2001 | Stewart et al. |

(Continued)

FOREIGN PATENT DOCUMENTS

| CN | 1351741 A | 5/2002 |
| CN | 1530635 A | 9/2004 |

(Continued)

OTHER PUBLICATIONS

Martire et al., "Location Based Services architecture for Simple Mobile Services", Information Society Technologies., Aug. 2008, version 1.1.*

(Continued)

*Primary Examiner* — Opiribo Georgewill

(57) ABSTRACT

The subject matter disclosed herein relates to systems, methods, apparatuses, articles, etc. for mobile device locating in conjunction with localized environments. For certain example implementations, a method may comprise obtaining at a mobile device one or more signals comprising information indicative of a location thereof. The information may be transmitted to one or more servers. A location context identifier (LCI) may be received responsive to the transmitting, with the LCI corresponding to a localized environment at which the mobile device is located. The LCI may be transmitted to the one or more servers. Location-based data may be received responsive to the transmitting of the LCI, with the location-based data being associated with the LCI and pertaining to the localized environment. The location of the mobile device may be determined with respect to the localized environment based, at least in part, on the location-based data. Other example implementations are described herein.

36 Claims, 7 Drawing Sheets

(51) Int. Cl.
  *H04W 4/02* (2009.01)
  *G01S 5/00* (2006.01)
  *H04W 4/04* (2009.01)

(56) References Cited

U.S. PATENT DOCUMENTS

| | | |
|---|---|---|
| 6,295,502 B1 | 9/2001 | Hancock et al. |
| 6,490,460 B1 | 12/2002 | Soliman |
| 6,529,164 B1 | 3/2003 | Carter |
| 6,859,727 B2 | 2/2005 | Bye et al. |
| 6,900,762 B2 | 5/2005 | Andrews et al. |
| 7,035,650 B1 | 4/2006 | Moskowitz et al. |
| 7,466,986 B2 | 12/2008 | Halcrow et al. |
| 7,480,513 B2 | 1/2009 | Woo |
| 7,647,055 B2 | 1/2010 | Gum et al. |
| 7,761,233 B2 | 7/2010 | Schott et al. |
| 7,912,633 B1 | 3/2011 | Dietsch et al. |
| 8,068,056 B2 | 11/2011 | Wachter et al. |
| 8,340,901 B2 | 12/2012 | Fahn et al. |
| 8,344,949 B2 | 1/2013 | Moshfeghi |
| 8,538,688 B2 | 9/2013 | Prehofer |
| 2001/0037305 A1 | 11/2001 | Mochizuki |
| 2002/0059025 A1 | 5/2002 | Kim et al. |
| 2003/0008661 A1 | 1/2003 | Joyce et al. |
| 2004/0015325 A1 | 1/2004 | Hirano et al. |
| 2004/0117753 A1 | 6/2004 | Kahng et al. |
| 2004/0139049 A1 | 7/2004 | Hancock et al. |
| 2004/0181335 A1 | 9/2004 | Kim et al. |
| 2004/0193365 A1 | 9/2004 | Kokojima et al. |
| 2004/0193707 A1 | 9/2004 | Alam et al. |
| 2006/0149465 A1 | 7/2006 | Park et al. |
| 2006/0217881 A1 | 9/2006 | Pei et al. |
| 2006/0245406 A1 | 11/2006 | Shim |
| 2006/0287813 A1 | 12/2006 | Quigley |
| 2007/0143016 A1 | 6/2007 | Kung et al. |
| 2007/0184845 A1 | 8/2007 | Troncoso |
| 2007/0219711 A1 | 9/2007 | Kaldewey et al. |
| 2007/0293239 A1 | 12/2007 | Dawson et al. |
| 2008/0082225 A1 | 4/2008 | Barrett |
| 2008/0102857 A1* | 5/2008 | Kim .......................... 455/456.3 |
| 2008/0183483 A1 | 7/2008 | Hart |
| 2008/0280624 A1 | 11/2008 | Wrappe |
| 2009/0019095 A1 | 1/2009 | Asahara et al. |
| 2009/0043502 A1 | 2/2009 | Shaffer et al. |
| 2009/0043504 A1 | 2/2009 | Bandyopadhyay et al. |
| 2009/0119010 A1 | 5/2009 | Moravec |
| 2009/0157294 A1 | 6/2009 | Geelen et al. |
| 2009/0163228 A1 | 6/2009 | Blumberg et al. |
| 2009/0216438 A1 | 8/2009 | Shafer |
| 2009/0238417 A1 | 9/2009 | Nielsen et al. |
| 2009/0251366 A1 | 10/2009 | McClure et al. |
| 2010/0008337 A1 | 1/2010 | Bajko |
| 2010/0023250 A1 | 1/2010 | Mays et al. |
| 2010/0023252 A1 | 1/2010 | Mays et al. |
| 2010/0125409 A1* | 5/2010 | Prehofer ........................ 701/207 |
| 2010/0259450 A1 | 10/2010 | Kainulainen et al. |
| 2010/0299065 A1 | 11/2010 | Mays |
| 2010/0305851 A1 | 12/2010 | Meyer et al. |
| 2011/0015860 A1 | 1/2011 | Nesbitt |
| 2011/0080848 A1 | 4/2011 | Khorashadi et al. |
| 2011/0081918 A1 | 4/2011 | Burdo et al. |
| 2011/0081919 A1 | 4/2011 | Das et al. |
| 2011/0082638 A1 | 4/2011 | Khorashadi et al. |
| 2011/0086646 A1 | 4/2011 | Gupta et al. |
| 2011/0172916 A1 | 7/2011 | Pakzad et al. |
| 2011/0178705 A1 | 7/2011 | Pakzad et al. |
| 2012/0007779 A1 | 1/2012 | Klepal et al. |
| 2012/0029817 A1 | 2/2012 | Khorashadi et al. |
| 2012/0044265 A1 | 2/2012 | Khorashadi et al. |
| 2012/0101727 A1 | 4/2012 | Mays et al. |
| 2012/0130632 A1 | 5/2012 | Bandyopadhyay et al. |
| 2012/0203453 A1 | 8/2012 | Lundquist et al. |
| 2013/0316742 A1 | 11/2013 | Gupta et al. |
| 2013/0317778 A1 | 11/2013 | Gupta et al. |
| 2013/0345967 A1 | 12/2013 | Pakzad |

FOREIGN PATENT DOCUMENTS

| | | |
|---|---|---|
| CN | 1707223 A | 12/2005 |
| CN | 101147407 A | 3/2008 |
| CN | 101151508 A | 3/2008 |
| CN | 101275854 A | 10/2008 |
| CN | 101427105 A | 5/2009 |
| CN | 101487714 A | 7/2009 |
| CN | 101576384 A | 11/2009 |
| DE | 102007045082 A1 | 4/2009 |
| EA | 009927 B1 | 4/2008 |
| EP | 0921509 A2 | 6/1999 |
| EP | 1708152 A2 | 10/2006 |
| EP | 2148167 A2 | 1/2010 |
| GB | 2355793 A | 5/2001 |
| JP | H112499552 A | 9/1999 |
| JP | 2000111648 A | 4/2000 |
| JP | 2001285337 A | 10/2001 |
| JP | 2002221422 A | 8/2002 |
| JP | 2003240591 A | 8/2003 |
| JP | 2004150827 A | 5/2004 |
| JP | 2006130131 A | 5/2006 |
| JP | 2006267057 A | 10/2006 |
| JP | 2006267114 A | 10/2006 |
| JP | 2007333998 A | 12/2007 |
| JP | 2008083112 A | 4/2008 |
| JP | 2008219394 A | 9/2008 |
| JP | 2009123105 A | 6/2009 |
| JP | 2010539547 A | 12/2010 |
| KR | 20070056673 A | 6/2007 |
| KR | 20080092781 A | 10/2008 |
| RU | 2358282 C2 | 6/2009 |
| TW | I230909 B | 4/2005 |
| TW | I240085 B | 9/2005 |
| TW | 200821550 A | 5/2008 |
| WO | WO-2005027553 A1 | 3/2005 |
| WO | WO-2005029120 | 3/2005 |
| WO | WO-2005106503 A1 | 11/2005 |
| WO | WO-2007025143 A1 | 3/2007 |
| WO | WO-2007056738 A2 | 5/2007 |
| WO | WO-2009040063 A1 | 4/2009 |
| WO | WO-2009056150 A1 | 5/2009 |

OTHER PUBLICATIONS

Beal J.R. Jr., et al., "Contextual Geolocation: A Specialized Application for Improving Indoor Location Awareness in Wireless Local Area Networks," College of Graduate Studies and Research, Minnesota State University, Mankato, MN, 2003, 17 pages.

Ceranka S. et al., "Application of particle filtering in navigation system for blind", ISSPA 2003, Seventh International Symposium on Signal Processing and Its Applications, Proceedings (CAT. No. 03EX714), vol. 2, 2003, pp. 495-498, XP002632287.

Chaer W.S., et al., "A mixture-of-experts framework for adaptive Kalman filtering", IEEE Transactions on Systems, Man and Cybernetics, Part B (Cybernetics), vol. 27, No. 3, Jun. 1997, pp. 452-464, XP002632376, IEEE USA ISSN: 1083-4419, DOI: 10.1109/3477.584952.

Chittaro L., et al., "Presenting Evacuation Instructions on Mobile Devices by means of Location-Aware 3D Virtual Environments", MobileHCI 2008, Sep. 2-5, 2008, Amsterdam, the Netherlands, pp. 395-398.

Evennou F., et al., "Map-aided indoor mobile positioning system using particlefilter", IEEE Wireless Communications and Networking Conference (IEEE CAT. No. 05TH8794), vol. 4, May 2, 2005, pp. 2490-2494, XP002632286, IEEE Piscataway, NJ, USA.

International Search Report and Report and Written Opinion—PCT/US2010/051214, International Search Authority—European Patent Office—Feb. 4, 2011.

Kandepu R., et al., "Constrained state estimation using the Unscented Kalman Filter", Control and Automation, 2008 16th Mediterranean Conference ON, IEEE Piscataway, NJ, USA, Jun. 25, 2008, pp. 1453-1458, XP031308449, ISBN: 978-1-4244-2504-4.

Li X., et al., "A Continuous-based Model for the Analysis of Indoor Spaces", Spatial and Temporal Reasoning for Ambient Intelligence

(56) References Cited

OTHER PUBLICATIONS

Systems, COSIT 2009 Workshop Proceedings, Aug. 2009, Edited by Mehul Bhatt and Hans Guesgen, pp. 44-53.

Li X., et al., "Assisting video surveillance in micro-spatial environments with a GIS approach", Geoinformatics 2007 Geospatial Information Technology and Applications, SPIE vol. 6754 (2007), pp. 675402-1 to 675402-8.

Lorenz B., et al., "A Hybrid Spatial Model for Representing Indoor Environments", W2GIS 2006, LNCS 2495 pp.102-112.

Lyardet F., et al., "CoINS: Context Sensitive Indoor Navigation System", Multimedia, 2006. ISM'06. Eighth IEEE International Symposium ON, IEEE, PI, Dec. 1, 2006, pp. 209-218, XP031041784, ISBN: 978-0-7695-2746-8 p. 1, right-hand column p. 2, right-hand column p. 6, left-hand column—p. 6, left-hand column.

Meneses F., et al., "Enhancing the Location-Context Through Inference Over Positioning Data", Department of Information Systems, University of Minho, Portugal, 2006, pp. 40-49.

Min K., et al., "The Mobile Spatial DBMS for the Partial Map Air Update in the Navigation", Proceedings of the 11th International IEEE Conference on Intelligent Transportation Systems, Oct. 12-15, 2008, pp. 476-481.

Nomoto K., et al., "An adaptive tracking filter controlling sampling frequency phased array radar", ICASSP 86 Proceedings. IEEE-IECEJ-ASJ International Conference on Acoustics, Speech and Signal Processing (CAT. No. 86CH2243-4), 1986, pp. 2571-2574, XP002632375, IEEE New York, NY, USA.

OMA (Open Mobile Alliance Ltd.), "Secure User Plan Location Architecture", Draft Version 3.0—Feb. 10, 2010, pp. 1-41.

Orville R.E., "Development of the National Lightning Detection Network," BAMS, Feb. 2008, 11 pages.

Paul a.S., et al., "Wi-Fi based indoor localization and tracking using sigma-point Kalman filtering methods", Position, Location and Navigation Symposium, 2008 IEEE/ION, IEEE, Piscataway, NJ, USA, May 5, 2008, pp. 646-659, XP031288927, ISBN: 978-1-4244-1536-6.

Sherwani, Lecture notes: "Global Routing", Algorithms for VLSI Physical Design Automation, 1992, pp. 6.1-6.40.

Soltani a. R., et al., "A fuzzy based multi-objective path planning of construction sites", Automation in Construction, Elsevier Science Publishers, Amsterdam, NL, vol. 13, No. 6, Nov 1, 2004, pp. 717-734, XP004543997, ISSN: 0926-5805, DOI: DOI 10.1016/J.Autcon.2004.04.012 p. 719, left-hand column, paragraph 2 p. 720-721 p. 723, right-hand column p. 725, right-hand column—p. 727 figures 1-3,5,7,10,14.

Whiting E.J., "Geometric, Topological & Semantic Analysis of Multi-Building Floor Plan Data", Jun. 2006, Thesis for Master of Science in Architecture Studies at Massachusetts Institute of Technology, pp. 1-74.

Xiaoqin et al., "The Control of Navigation Along a Wall for a Mobile Robot Based on Infrared psd," (Wall-following Navigation Control for Infra PSD-based Mobile Robot) Machine Tool & Hydraulics, Sep. 30, 2009, vol. 37, No. 9, pp. 133-136.

Yanco H.A., "Wheelesley: A Robotic Wheelchair System: Indoor Navigation and User Interface", Assistive Technology and AI, LNAO 1458, V.O. Mittal et al (Eds), 1998, pp. 256-268.

Zha H., et al., "Detecting changes in a dynamic environment for updating its maps by using a mobile robot", Intelligent Robots and Systems, 1997, IROS 97, Proceedings of the 19 97 IEEE/RSJ International Conference on Grenoble, France Sep. 11-17, 1997, New York, NY, USA, IEEE, US, vol. 3, Sep. 7, 1997, pp. 1729-1734, XP010264873, DOI: 10.1109/IROS.1997.656593, ISBN: 978-0-7803-4119-7.

Butz A., et al., "A Hybrid Indoor Navigation System," International Conference on Intelligent User Interfaces, 2001, pp. 1-8.

Li X., et al., "A continuous-based model for the analysis of indoor spaces", Conference on Spatial Information Theory (COSIT 2009), Sep. 21, 2009, XP002690502, [retrieved on Jan. 11, 2013].

Nizetic, I., et al., "A prototype for the short-term prediction of moving object's movement using markov chains", proceedings of the ITI, Jun. 25, 2009, XP002690504, pp. 559-564, [retrieved on Jan. 16, 2013].

Widyawan et al: "A novel backtracking particle filter for pattern matching indoor localization", Proceedings of the First ACM International Workshop on Mobile Entity Localization and Tracking in GPS-Less Environment, Melt '08, Jan. 1, 2008, p. 79, XP055038756, New York, USA DOI: 10.1145/1410012.1410031, ISBN: 978-1-60-558189-7.

\* cited by examiner

MOBILE DEVICE LOCATING IN
CONJUNCTION WITH LOCALIZED
ENVIRONMENTS

CLAIM OF PRIORITY UNDER 35 U.S.C. §119
AND/OR §120

The present application for patent is a continuation application of, and claims priority to, U.S. patent application Ser. No. 12/895,583, entitled "MOBILE DEVICE LOCATING IN CONJUNCTION WITH LOCALIZED ENVIRONMENTS," and filed Sep. 30, 2010, which claims priority to U.S. Provisional Application Ser. No. 61/247,865, entitled "SYSTEM FOR INDOOR LOCATION," and filed Oct. 1, 2009, all of which are assigned to the assignee hereof, and expressly incorporated herein by reference.

BACKGROUND

1. Field

The subject matter disclosed herein relates to locating a mobile device in conjunction with a localized environment.

2. Information

Humankind has always struggled to journey from point "A" to point "B". In ancient times, individuals in unfamiliar territory wandered around without guidance or perhaps risked asking local inhabitants for directions. People eventually developed maps to provide written guidance for reaching a desired destination. As literacy and the availability of paper became increasingly common, more people attained the ability to use maps during their travels.

Maps began to be available in electronic form during the 20$^{th}$ century. With the advent of the Internet, people could electronically access maps of many places from all over the globe. Web mapping services could also provide directions from point "A" to point "B". These web-based mapping directions were relatively static. With the invention of satellite-positioning system (SPS) technology and ever-smaller electronic devices, however, so-called turn-by-turn directions could be provided dynamically as people journeyed toward their destination.

Unfortunately, these electronic maps and web-based mapping services focus on providing directions in the outdoors, such as from one postal address to another postal address. Similarly, turn-by-turn directions have traditionally been limited to roadways. An ability to provide analogous mapping and directional services in specific environments, such as indoors, is currently lacking.

BRIEF DESCRIPTION OF THE FIGURES

Non-limiting and non-exhaustive aspects, features, etc. will be described with reference to the following figures, wherein like reference numerals refer to like parts throughout the various figures.

SUMMARY

Figure 1:
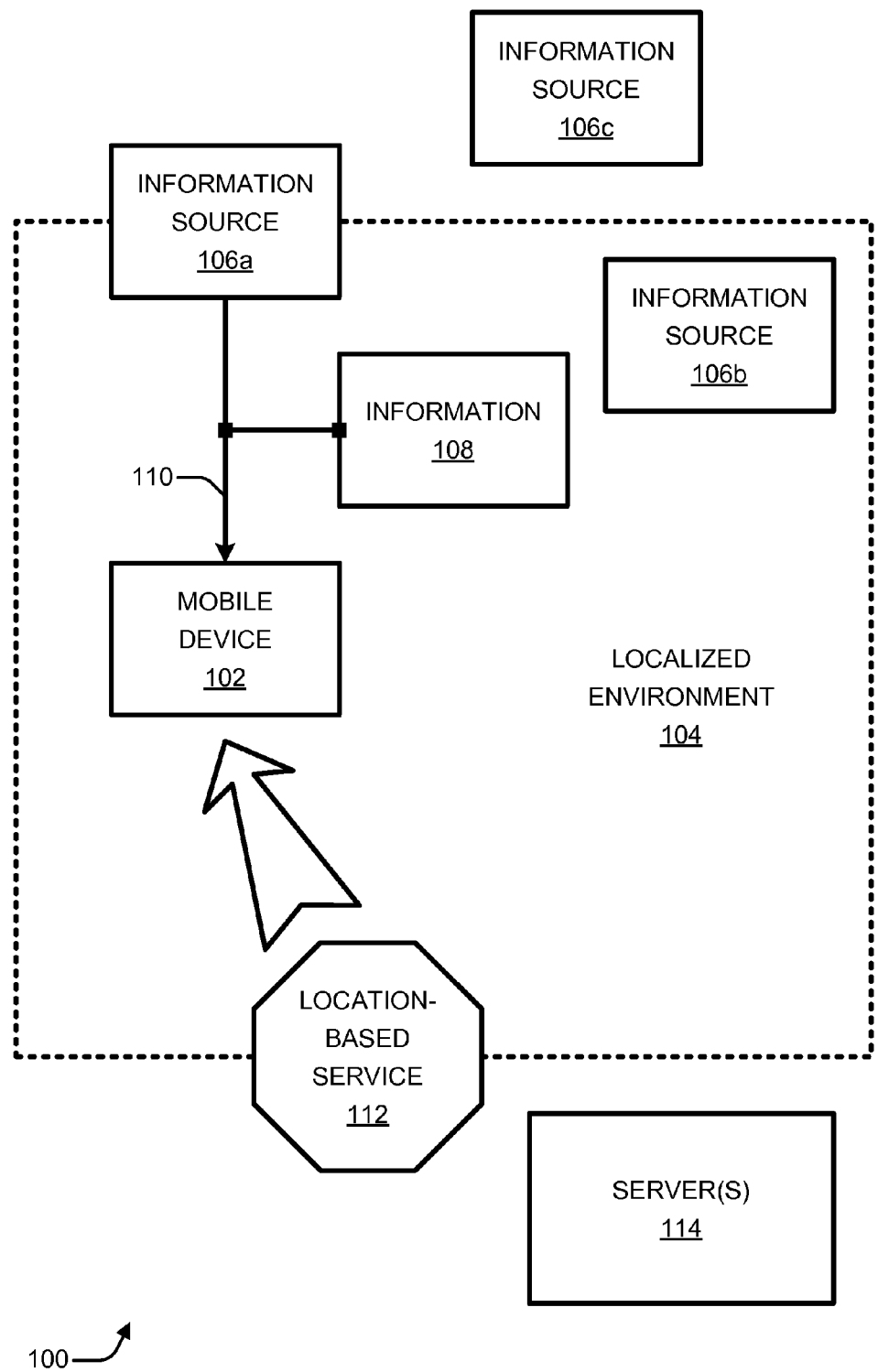
FIG. 1 is a schematic block diagram illustrating a mobile device in conjunction with an example localized environment in which the mobile device may obtain information indicative of its location such that a location-based service may be provided according to an implementation.

For certain example implementations, a method may comprise obtaining at a mobile device one or more signals comprising information indicative of a location of the mobile device. The information indicative of the location of the mobile device may be wirelessly transmitted to one or more servers. A location context identifier may be wirelessly received responsive to the transmitting of the information indicative of the location of the mobile device, with the location context identifier corresponding to a localized environment at which the mobile device is located. The location context identifier may be wirelessly transmitted to the one or more servers. Location-based data may be wirelessly received responsive to the transmitting of the location context identifier, with the location-based data being associated with the location context identifier and pertaining to the localized environment. The location of the mobile device may be determined with respect to the localized environment based, at least in part, on the location-based data. It should be appreciated, however, that these are merely example implementations and that other implementations are described herein and may be implemented without deviating from claimed subject matter.

DETAILED DESCRIPTION

Reference throughout this Specification to "a feature," "one feature," "an example," "one example," and so forth means that a particular feature, structure, characteristic, etc. described in connection with the feature and/or example may be relevant to at least one feature and/or example of claimed subject matter. Thus, the appearances of a phrase such as "in one example," "an example," "in one feature," "a feature," "in an example implementation," "for certain example implementations," and so forth in various places throughout this Specification are not necessarily all referring to the same feature, example, and/or example implementation. Furthermore, the particular features, examples, structures, characteristics, etc. may be combined in one or more example implementations, example systems, and so forth.

As indicated above, electronic maps and web-based mapping services are not usually offered for specific, localized environments. Similarly, turn-by-turn directions are not typically provided for specific, localized environments. Localized environments may include, by way of example but not limitation, indoor spaces such as building structures, private land areas such as apartment complexes, and so forth. Many indoor spaces are sufficiently large, complex, and/or otherwise difficult to navigate such that location information may be beneficial, e.g., to a user of a mobile device. Hence, a user may want navigational information or another location-based service (LBS) to be provided via a mobile device in an indoor or other localized environment. Unfortunately, in contrast with outdoor areas in which location information may be available from e.g. SPS technologies, indoor position information is generally not available. Moreover, to fully provide a range of location-based services, localized position-level metadata and service-level metadata may be used.

Using relatively high precision location information, applications for a mobile device may provide a user with many different services such as, for example, positioning, personal vehicle/pedestrian navigation, real-time turn-by-turn directions, location-based searching, just to name a few examples. In such situations, relatively high precision location information (e.g., that which is obtained from SPS infrastructure and/or the like) may be processed according to a global coordinate system (e.g., latitude and longitude or other earth-centered xyz coordinates). Although such use of location information referenced to a global coordinate system may be useful in providing some services (e.g., outdoor vehicle navigation), such location information referenced to a global coordinate system may be impractical for other types of services such as indoor pedestrian navigation. For example, even if a local map is known, it may still be unknown how such a local map fits in relation to the earth in a global coordinate system.

Accordingly, in certain example implementations, one or more local coordinate systems may be established for particular services such as indoor pedestrian navigation, searching of local points of interest that are not directly mapped or referenced to a global coordinate system, and so forth, just to name a couple of examples. In particular example implementations, one or more servers, such as at least one positioning server, may store and associate location context identifiers (LCIs) with specific "location contexts." Such a location context may include locally-defined areas or other environments such as, for example, particular floors of buildings or other indoor areas that may not mapped according to a global coordinate system. Location context identifiers may be used as handles for requesting additional information associated with (e.g., laid over) such a location context such as, for example, routes or paths over an indoor map, points of interest that are local or unique to particular location contexts, and so forth, just to name a couple of examples.

In other particular example implementations, a mobile device that moves into a localized environment may contact a positioning server to obtain one or more location context identifiers that are associated with the localized environment. To obtain a location context identifier that is associated with or relevant to a given localized environment, the mobile device may first receive information from local transmitters that is/are associated with and/or representative of the given localized environment. For example, a mobile device may obtain medium access control (MAC) identifiers (MAC IDs) from signals transmitted from one or more Wi-Fi access points and/or received signal strength indications (RSSIs) or round-trip times (RTTs) related to same. Alternatively, a mobile device may receive signals transmitted from an SPS and/or information from an application programming interface (API) capable of providing some level of location information, for example.

A mobile device may wirelessly communicate with a positioning server to request one or more location context identifiers associated with a given localized environment by providing location information as discussed above (e.g., MAC IDs, RSSI, and/or other location information). A positioning server may then use such information received from a mobile device to determine a location context (e.g., a floor of a building or other indoor space) and respond to the request by providing one or more location context identifiers associated with the determined location context.

In certain example implementations, upon obtaining at least one location context identifier, a mobile device may use the location context identifier as a handle to request location-based data from one or more servers, such as at least one location-based-data server. Location-based data may be overlaid on a map of a localized environment. In particular example implementations, a mobile device may also and/or alternatively use a location context identifier to obtain a map of a localized environment. In other particular example implementations, a mobile device may use a location context identifier to obtain information to be used in a particular application connected to a particular corresponding location context. For example, a mobile device may obtain information relating to a particular location context for use in an indoor pedestrian navigation application. Such an application may provide, for example, a display of corridors, rooms, hallways, doors, entry ways, restrooms, and/or (other) points of interest. For a particular application, such information may define a routing topology set out in a coordinate system that is local to a particular location context, as distinguishable from a global coordinate system. In a particular example implementation pertaining to points of interest, a mobile device may obtain information relating to a particular location context by sending a request including a location context identifier to a point of interest server. Such a point of interest server may associate the received location context identifier with point of interest information. Such point of interest information may be returned to the requesting mobile device to be used in a particular application pertaining to points of interest.

FIG. 1 is a schematic block diagram 100 illustrating a mobile device in conjunction with an example localized environment in which the mobile device may obtain information indicative of its location such that a location-based service may be provided according to an implementation. As illustrated, block diagram 100 may include a mobile device 102 that is at least proximate to a localized environment 104 and at least one information source 106. More specifically, block diagram 100 may further include multiple information sources 106a, 106b, and 106c; information 108; at least one signal 110; at least one location-based service 112; and one or more servers 114.

For certain example implementations, a mobile device 102 may obtain one or more signals 110 comprising information 108 that is indicative (e.g., that provides a "hint") of a location of mobile device 102. Although mobile device 102 is shown in block diagram 100 as obtaining signals 110 from a single source 106a, such signals 110 may alternatively be obtained from multiple information sources 106 (e.g., an information source 106a and an information source 106c). Moreover, a mobile device 102 may obtain one or more signals 110 comprising information 108 that is indicative of a location of mobile device 102 by retrieving such signals 110 from a memory or other information source 106 that is integral with mobile device 102. A localized environment 104 may correspond, for example, to a local coordinate system.

Examples of mobile devices 102 may include, but are not limited to, a mobile station, a mobile phone, a user equipment, a netbook, a laptop, a tablet or slate computer, an entertainment appliance, some combination thereof, and so forth, just to name a few examples. Additionally and/or alternatively, a mobile device 102 may comprise any mobile device with wireless measurement capabilities and/or with other motion-related sensors. Additional mobile device examples are described herein below with particular reference to FIG. 9. However, claimed subject matter is not limited to any particular type, category, size, capability, etc. of mobile device.

Examples of information sources 106 may include, but are not limited to, Wi-Fi/WLAN access points, Worldwide Interoperability for Microwave Access (WiMAX) nodes, femtocells, cellular base stations and other cellular wireless nodes, SPS infrastructure (e.g., satellites, pseudolites, etc.), a Bluetooth or other similarly short-ranged wireless node, combinations thereof, and so forth. As indicated, information sources 106 may be located internal to a localized environment 104, external to a localized environment 104, on a border of a localized environment 104 (e.g., partially interior and partially exterior thereto), external to a mobile device 102, internal to a mobile device (not explicitly shown), physically separate from a mobile device, physically connected to a mobile device (not explicitly shown), any combination thereof, and so forth, just to name a few examples. Thus, in addition to interacting with information sources 106, such information sources 106 may also and/or alternatively comprise at least a portion of a mobile device and/or hardware or software components thereof to obtain information 108.

In an example implementation, an information source 106 may comprise a wireless access device (not separately illustrated). A wireless access device may comprise a Wi-Fi/WLAN access point (AP), a femtocell device, a WiMAX node device, and so forth, just to name a few examples. Information 108 may comprise one or more wireless access device identifiers associated with one or more wireless access devices that are within a wireless communication range of a mobile device and that are transmitting signals including such wireless access device identifiers. For a Wi-Fi access point implementation of an information source 106, for example, a wireless access device identifier may comprise an access point MAC ID. Furthermore, information 108 that is indicative of a location of a mobile device may also or alternatively include measurements and other detected information, such as round-trip time (RTT) measurements, received signal strength indicator/indication (RSSI) measurements, and so forth, just to name a couple of examples.

When multiple wireless access devices are within range of a mobile device, a position of the mobile device may be determined, to a desired level of precision, by a mobile device using trilateration, for example. A local context may be acquired based at least partly on one or more MAC IDs, for example, being transmitted by access points that are proximate (e.g., within a signal range) of a mobile device. A local context may relate, by way of example but not limitation, to a map or other location-based information that is/are represented on a local level (e.g., with a local coordinate system) instead of a global coordinate system. A global coordinate system may correspond, for example, to a set of earth-centered coordinates. A local context may correspond, for example, to a floor plan or similar that identifies positions of points of interest in locally-relevant terms. A local context may be associated with a global coordinate system for translating a relative position into a global one.

Upon receiving information that is indicative of a location of a mobile device (e.g., one or more location "hints"), a responding server may also or alternatively identify and return to a mobile device a relevant set of one or more network elements (e.g., Wi-Fi/WLAN access points, femtocell nodes, WiMAX node devices, etc.). Such a set of relevant network element(s) may include and/or be accompanied by positions of the relevant network element(s). Positions of network elements may be in local coordinates and/or global (e.g., WGS84) coordinates. Returned network element information may also contain other information to aid positioning by a mobile device, such as a processing delay of a wireless access device or an actual RSSI-distance model. Such information for network elements may comprise part of map information and/or other location-based data.

In an example implementation, an information source 106 may comprise a memory of a mobile device 102. Signals 110 may be retrieved and obtained from such a memory, and information 108 may comprise SPS coordinates (e.g., earth-centered GPS coordinates) that were acquired via SPS infrastructure (e.g., prior to entering localized environment 104). If such information 108 is stale, a mobile device may decline to use it. In another example implementation, information source 106 may comprise an input component of a mobile device. For instance, a camera or microphone may detect and obtain at least one signal 110 (e.g., an image, a sound, etc.) that serves as a location hint and thus comprises information indicative of a location of a mobile device.

In another example implementation, an information source 106 may comprise a layer/application of a mobile device. For instance, relatively rough location information may be obtained through an API call to an available positioning layer (e.g., an SPS or other layer that includes or otherwise has access to SPS coordinate data, such as an assisted SPS layer). Signals 110 may be obtained from such a positioning layer/application. Such an application may obtain location information automatically, manually (e.g., when a user "checks-in" or otherwise indicates a general or specific location), a combination thereof, and so forth, just to name a couple of examples. Such rough location information may have been obtained prior to entry into a localized environment. If such information is stale, it may be ignored.

In certain example implementations, a mobile device 102 may communicate and otherwise interact with one or more servers 114. By way of example but not limitation, such interaction may facilitate the providing of location-based services 112. Examples of server(s) 114 are described herein below with particular reference to FIGS. 2, 4, and 7. Examples of location-based services 112 may include, but are not limited to, providing navigational information. For instance, map information, a routing graph, turn-by-turn directional instructions, "static" directions from one location to another location, proximate points of interest, combinations thereof, etc. may be provided. Other examples of location-based services 112 may include, but are not limited to, routing, positioning, position filtering, navigation, incentives applications (e.g., offers based on location), location-based search, combinations thereof, and so forth. Navigational information or other information related to a location-based service (LBS) may be provided by presenting it to a user (e.g., visually, tactilely, and/or aurally via a mobile device), by transmitting it to a mobile device, by storing data at a mobile device, some combination thereof, and so forth, just to enumerate a few examples. Additional examples of location-based services 112, as well as example aspects thereof, are described herein below with particular reference to FIG. 8.

In conjunction with and/or in furtherance of the providing of location-based services 112, position-related metadata and/or service-related metadata may be delivered to a mobile device individually and/or as part of location-based data. For example, an AP MAC address, as well as locations and characteristics thereof, may be sent to a mobile device. Also, different types of map-related data may be delivered. Examples of map-related data include, but are not limited to, lines and arcs to draw a map; portals such as staircases, external doors, elevators, etc.; POIs such as rooms, people, etc.; combinations thereof; and so forth. Graph related data may also be delivered. Examples of graph-related data include, but are not limited to, a coarse-grained routing graph for navigation, a fine-grained connectivity graph for position filtering, some combination thereof, and so forth. Other types of data may facilitate additional positioning and/or navigational processing. For example, signal heatmap data and/or models, position probability data, combinations of such data, etc. may be delivered to a mobile device. Additionally, locations of wireless access devices and/or ranging models may be delivered to mobile devices. Other examples of position-related metadata and service-related metadata are described herein below.

Figure 2:
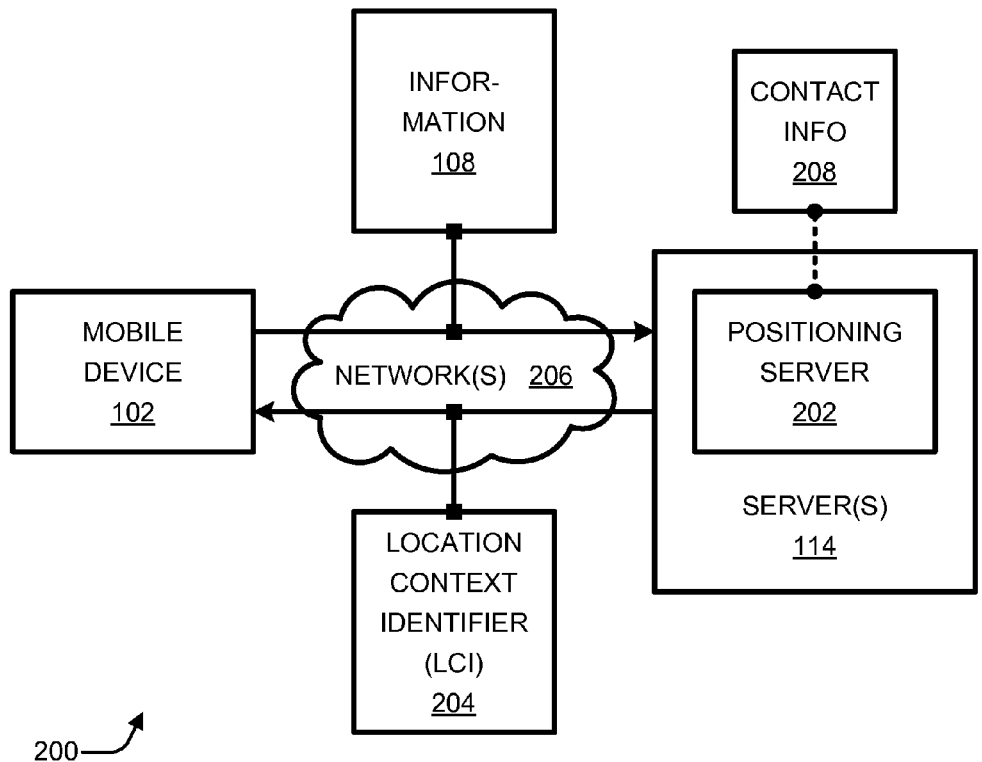
FIG. 2 is a schematic block diagram illustrating an example interaction between a mobile device and a positioning server to obtain a location context identifier according to an implementation.

FIG. 2 is a schematic block diagram 200 illustrating an example interaction between a mobile device and a positioning server to obtain a location context identifier according to an implementation. As illustrated, block diagram 200 may include a mobile device 102, information 108, one or more servers 114 such as at least one positioning server 202, a location context identifier (LCI) 204, one or more networks 206, and contact information 208.

For certain example implementations, a mobile device 102 may transmit information 108 that is indicative of a location of the mobile device to a positioning server 202 (or, more generally, to a first server of one or more servers 114). Accordingly, positioning server 202 may receive information 108 that is indicative of a location of a mobile device 102. In response, positioning server 202 may initiate transmission to mobile device 102 of a location (or local) context identifier 204 that is associated with information 108 that is indicative of a location of the mobile device. Accordingly, mobile device 102 may receive location context identifier 204 from positioning server 202. A location context identifier 204 may be a handle, a label, a word, a numerical identifier, an alphanumeric value, or any other representation corresponding to at least one particular localized environment 104. However, claimed subject matter is not limited to any particular implementation(s) of a location context identifier 204.

Network(s) 206 may comprise one or more networks. Examples of such network(s) 206 may include, but are not limited to, one or more of: a wireless network, a wired network, an internet, a telecommunications network, an ad hoc network, a local area network (LAN), a wide area network (WAN), a WiMAX network, a Wi-Fi network, a Bluetooth network, a public network, a private network, a computer network, a cellular network, a cable or fiber optic network, any combination thereof, and so forth. A different network 206, a different type of network 206, and/or a different number of networks 206 may be utilized to communicate information 108 from mobile device 102 to positioning server 202 in comparison to the network(s) used to communicate location context identifier 204 from positioning server 202 to mobile device 102.

In an example implementation, mobile device 102 may transmit information 108 wirelessly to an access point, a femtocell node, a cellular base station, etc., which may then forward such information 108 to a positioning server 202 over one or more wired networks (e.g., a telecommunications network and/or the Internet). Thus, in an example implementation in which communications between mobile device 102 and positioning server 202 are made at least partially over a wireless network, mobile device 102 may wirelessly transmit information 108 that is indicative of a location of the mobile device to positioning server 202, even if such transmission to positioning server 202 is completed at least partially over a wired network. Similarly, mobile device 102 may wirelessly receive location context identifier 204 from positioning server 202 even if transmission is initiated by positioning server 202 over a wired network. Other communication scenarios may alternatively be implemented without departing from claimed subject matter.

In an example implementation, information 108 may be transmitted to a positioning server 202 according to predetermined contact information 208 that is associated with positioning server 202. By way of example but not limitation, predetermined contact information 208 may comprise a uniform resource identifier (URI). A URI may comprise, for instance, an address, such an internet protocol (IP) address, a phone number, an email address, etc.; a network location identifier generally, such as a uniform resource locator (URL); an account or user name; some combination thereof; and so forth, just to name a few examples. A mobile device 102 may obtain predetermined contact information 208 for use in accessing a positioning server 202 using any one or more of several techniques. By way of example but not limitation, predetermined contact information 208 may be preconfigured (e.g., stored at a mobile device), may be ascertained via a broadcast or other transmission over link-layer advertisements (e.g., at a given localized environment 104), may be ascertained via one or more dynamic host configuration protocol (DHCP) services, any combination thereof, and so forth. However, claimed subject matter is not limited to any particular implementation(s) for predetermined contact information 208.

Positioning server 202 may determine a location context identifier 204 that is associated with information 108 that is indicative of a location of a mobile device. Such a determination may be made by positioning server 202 using, by way of example but not limitation, a data structure that maps information 108 that is indicative of a location of mobile devices to location context identifiers 204, and vice versa. An example mapping data structure is described herein below with particular reference to FIG. 3. However, claimed subject matter is not so limited to any particular mapping data structure and/or association mechanism.

Figure 3:
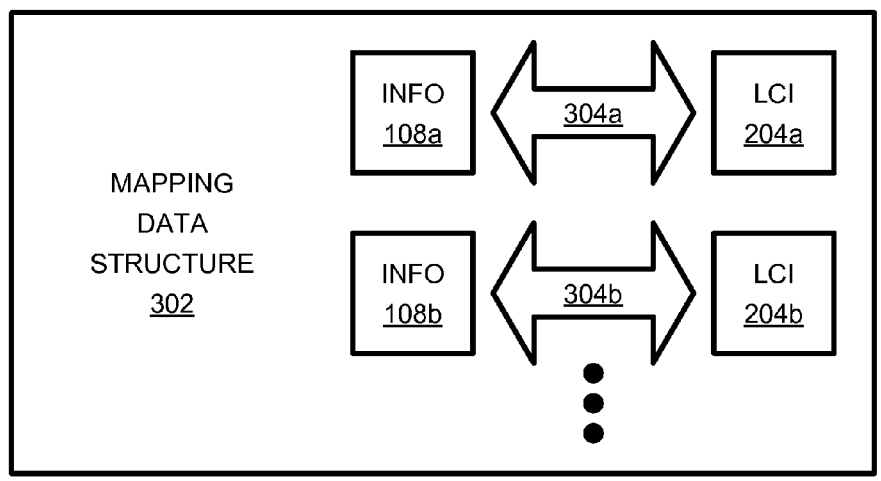
FIG. 3 is a schematic block diagram of an example location context identifier mapping data structure that associates information indicative of a location of a mobile device with location context identifiers according to an implementation.

FIG. 3 is a schematic block diagram 300 of an example location context identifier mapping data structure that associates information indicative of a location of a mobile device with location context identifiers according to an implementation. As illustrated, block diagram 300 may include a location context identifier mapping data structure 302 that includes multiple association entries 304. For certain example implementations, such an entry 304 may associate information 108 with a location context identifier 204. More specifically, a respective entry 304a, 304b may associate respective information 108a, 108b that is indicative of a location of a mobile device with a respective location context identifier 204a, 204b. Although only two such association entries 304a and 304b are explicitly shown in FIG. 3, a location context identifier mapping data structure 302 may alternatively have more (or fewer) association entries 304 without departing from claimed subject matter.

In an example operative implementation and with reference also to block diagram 200 (of FIG. 2), a positioning server 202 may receive information 108 that is indicative of a location of a mobile device 102 (e.g., from mobile device 102). Positioning server 202 may comprise or otherwise have access to a location context identifier mapping data structure 302.

Based on particular information 108 (e.g., info 108b) and responsive to receipt thereof, positioning server 202 may access location context identifier mapping data structure 302 to retrieve a particular location context identifier 204 (e.g., LCI 204b) that is associated (e.g., at a particular association entry 304b) with the received particular information 108 (e.g., info 108b). Such a retrieved location context identifier 204 may be returned to mobile device 102 via one or more networks 206. By way of example but not limitation, a location context identifier mapping data structure 302 may associate one or more MAC IDs (as an example of info 108) of one or more Wi-Fi access points with at least one alphanumerical identification (as an example of an LCI 204), which identification corresponds to at least one localized environment 104.

Figure 4:
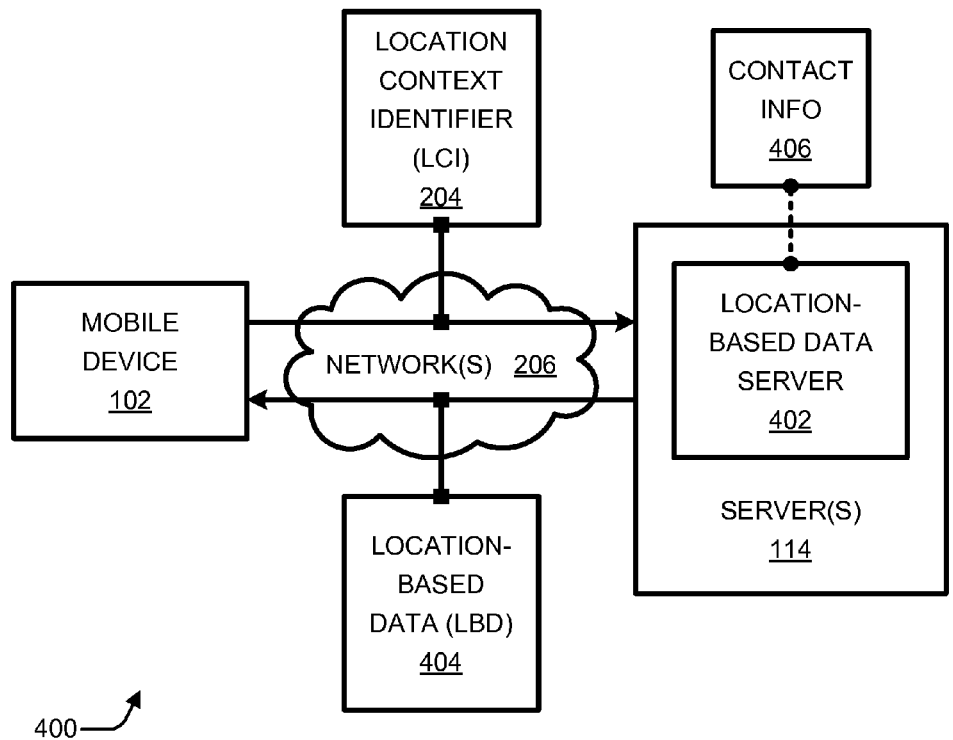
FIG. 4 is a schematic block diagram illustrating an example interaction between a mobile device and a location-based data server to obtain location-based data according to an implementation.

FIG. 4 is a schematic block diagram 400 illustrating an example interaction between a mobile device and a location-based data server to obtain location-based data according to an implementation. As illustrated, block diagram 400 may include a mobile device 102, a location context identifier (LCI) 204, one or more networks 206, one or more servers 114 such as at least one location-based data server 402, location-based data (LBD) 404, and contact information 406.

For certain example implementations, a mobile device 102 may transmit at least one location context identifier 204 to a location-based data server 402 (or, more generally, to a second server of one or more servers 114). Accordingly, location-based data server 402 may receive a location context identifier 204 from mobile device 102. In response, location-based data server 402 may initiate transmission to mobile device 102 of location-based data 404 that is associated with location context identifier 204. Accordingly, mobile device 102 may receive location-based data 404 from location-based data server 402. Location-based data 404 may comprise any data that enables, facilitates, is related to, etc. the providing of a location-based service (e.g., a location-based service 112 of FIG. 1). Examples of location-based data 404 are additionally described herein above generally as well as herein below with particular reference to FIG. 8.

As noted above (with reference to FIG. 2), a network 206 may comprise one or more networks. For example, a network 206 may include at least a portion of a wireless network and at least a portion of a wireline network, such as the Internet. A different network 206, a different type of network 206, and/or a different number of networks 206 may be utilized to communicate a location context identifier 204 from mobile device 102 to location-based data server 402 in comparison to network(s) that are used to communicate location-based data 404 from location-based data server 402 to mobile device 102. Furthermore, a different network or networks may be utilized for communications between a mobile device 102 and a location-based data server 402 (of FIG. 4) as compared to a network or networks that may be utilized for communications between a mobile device 102 and a positioning server 202 (of FIG. 2).

In an example implementation, mobile device 102 may transmit a location context identifier 204 wirelessly to an access point, a femtocell node, a cellular base station, etc., which then forwards such location context identifier 204 to a location-based data server 402 over one or more wired networks (e.g., a telecommunications network and/or the Internet). Thus, in an example implementation in which communications between mobile device 102 and location-based data server 402 are made at least partially over a wireless network, mobile device 102 may wirelessly transmit a location context identifier 204 to a location-based data server 402, even if such transmission to location-based data server 402 is effectuated at least partially over a wired network. Similarly, mobile device 102 may wirelessly receive location-based data 404 from location-based data server 402 even if transmission is initiated by location-based data server 402 over a wired network. Other communication scenarios may alternatively be implemented without departing from claimed subject matter.

In an example implementation, a location context identifier 204 may be transmitted to a location-based data server 402 according to predetermined contact information 406 that is associated with location-based data server 402. By way of example but not limitation, predetermined contact information 406 may comprise a uniform resource identifier (URI). A URI may comprise, for instance, an address, such an internet protocol (IP) address, a phone number, an email address, etc.; a network location identifier generally, such as a uniform resource locator (URL); an account or user name; some combination thereof; and so forth, just to name a few examples. A mobile device 102 may obtain predetermined contact information 406 for use in accessing a location-based data server 402 using any one of several techniques. By way of example but not limitation, predetermined contact information 406 may be preconfigured (e.g., stored at a mobile device), may be ascertained via a broadcast or other transmission(s) over link-layer advertisements (e.g., at a given localized environment 104), may be ascertained via one or more dynamic host configuration protocol (DHCP) services, any combination thereof, and so forth. Furthermore, predetermined contact information 406 may alternatively be provided in response to information 108 that is indicative of a location of a mobile device (e.g., returned to a mobile device 102 from a positioning server 202 of FIG. 2). Predetermined contact information 406 may also be communicated along with a location context identifier 204 and/or as at least part of a location context identifier 204 (e.g., by embedding a URI or similar in a location context identifier 204 that is sent from a positioning server 202 of FIG. 2). However, claimed subject matter is not limited to any particular implementation(s) for predetermined contact information 406.

One or more servers 114 (e.g., of FIGS. 1, 2, and 4) may be co-located with one another and/or partially or fully distributed within a data center or geographically dispersed. As is known in the art, one or more servers may be realized on a single machine or on/across multiple machines, realized with a rack of servers and/or with a modularized unit for a data center, realized using separate resources (e.g., memory, processing, and/or communication bandwidth, etc. resources), realized using shared resources, realized using a virtual machine (VM) architecture, realized using an architecture with logical divisions and/or overlap, any combination thereof, and so forth, just to name a few examples. Thus, positioning server 202 (e.g., which is associated at least with FIGS. 2 and 7) and location-based data server 402 (e.g., which is associated at least with FIGS. 4 and 7) both individually and/or jointly may be realized in any of these manners. For example, positioning server 202 and location-based data server 402 may be located on different machines or co-located on a single machine. Furthermore, positioning server 202 and location-based data server 402 may be realized as a single actual or single logical server having separate and/or interrelated positioning functionality and location-based-data serving functionality. In an example operative implementation, point of interest (POI) information (e.g., one or more layers pertaining to a local context) may be retrieved from one or more location-based data servers 402 (e.g., one or more POI servers) using a location context identifier 204. In another example operative implementation, metadata may be retrieved from at least one positioning server 202 using a location context identifier 204, and other information about a localized environment may be retrieved from at least one location-based data server 402 using a location context identifier 204.

A device or apparatus for a server may include any one or more parts operating together to provide some processing service, such as a single server, a bank of servers, a server farm, multiple processors and memory elements communicating over some local and/or distributed interconnect, and so forth, just to name a few examples. Such a device, apparatus, and/or system realizing a positioning server 202 and/or a location-based data server 402 may comprise at least part of at least one node of a telecommunications network, at least one server on the internet, some combination thereof, and so forth, just to name a couple of examples. An apparatus may itself comprise one or more devices.

Location-based data server 402 may determine location-based data 404 that is associated with a location context identifier 204. Such a determination may be made by location-based data server 402 using, by way of example but not limitation, a data structure that maps location context identifiers 204 to location-based data 404, and vice versa. An example mapping data structure is described herein below with particular reference to FIG. 5. However, claimed subject matter is not so limited to any particular mapping data structure and/or association mechanism.

Figure 5:
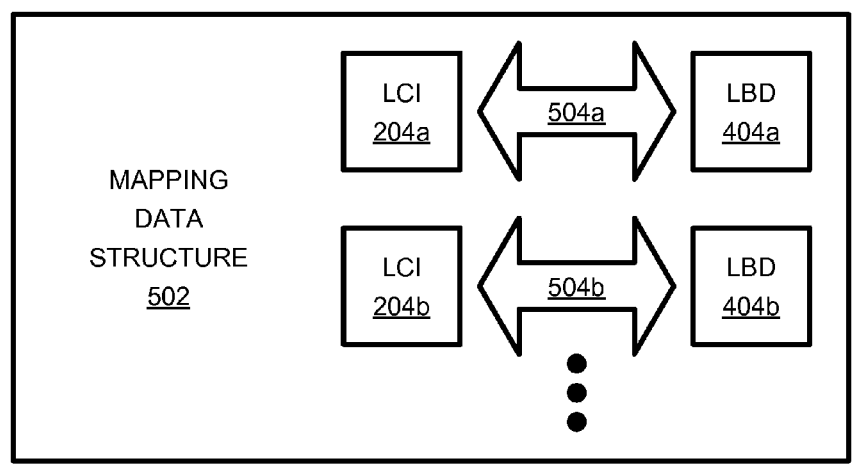
FIG. 5 is a schematic block diagram of an example location-based-data mapping data structure that associates location context identifiers with location-based data according to an implementation.

FIG. 5 is a schematic block diagram 500 of an example location-based-data mapping data structure that associates location context identifiers with location-based data according to an implementation. As illustrated, block diagram 500 may include a location-based-data mapping data structure 502 that includes multiple association entries 504. For certain example implementations, such an entry 504 may associate a location context identifier 204 with location-based data 404. More specifically, a respective entry 504*a*, 504*b* may associate a respective location context identifier 204*a*, 204*b* with respective location-based data 404*a*, 404*b*. Although only two such association entries 504*a* and 504*b* are explicitly shown in FIG. 5, a location-based-data mapping data structure 502 may alternatively have more (or fewer) association entries 504 without departing from claimed subject matter.

In an example operative implementation and with reference also to block diagram 400 (of FIG. 4), a location-based data server 402 may receive a location context identifier 204 that corresponds to a localized environment 104 (of FIG. 1) from a mobile device 102. Location-based data server 402 may comprise or otherwise have access to a location-based-data mapping data structure 502. Based on a particular location context identifier 204 (e.g., LCI 204*a*) and responsive to receipt thereof, location-based data server 402 may access location-based-data mapping data structure 502 to retrieve particular location-based data 404 (e.g., LBD 404*a*) that is associated (e.g., at a particular association entry 504*a*) with the received particular location context identifier 204 (e.g., LCI 204*a*). Such retrieved location-based data 404 may be returned to mobile device 102 via one or more networks 206. By way of example but not limitation, a location-based-data mapping data structure 502 may associate at least one alpha-numerical identification (as an example of LCI 204) with map information (as an example of LBD 404), which map information may include a routing graph, known wireless access devices that are present at the given local context, points of interest, or other annotation information pertaining to at least one localized environment 104 and distributed across one or more layers of such annotation information. Location-based data 404 may be requested by a mobile device 102 and/or provided by a location-based data server 402 as a whole unit and/or in multiple pieces (e.g., in one or more layers).

Figure 6:
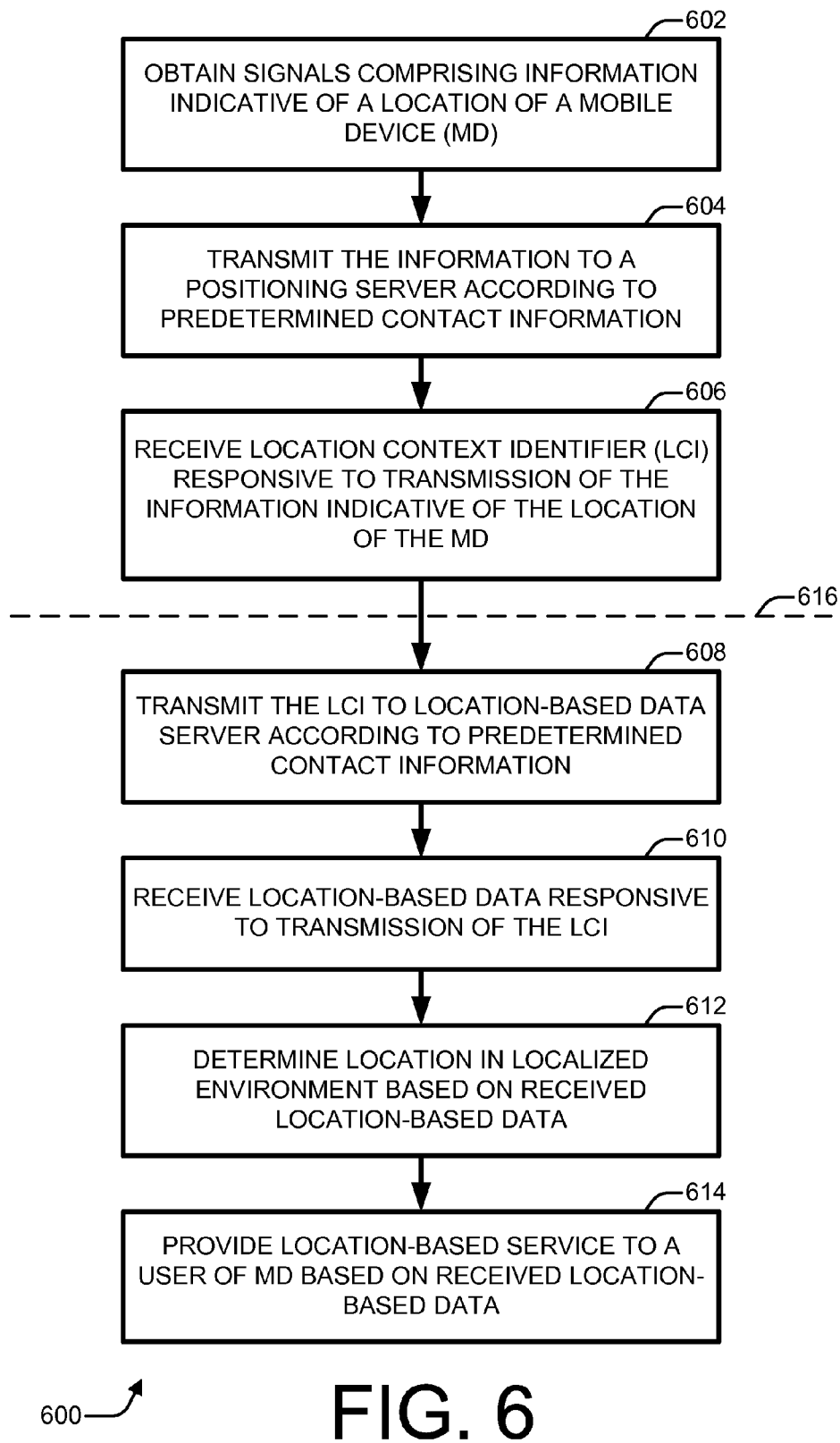
FIG. 6 is a flow diagram illustrating an example method for a mobile device to obtain a location context identifier based at least partly on information indicative of a location of a mobile device and to obtain location-based data based at least partly on a location context identifier according to an implementation.

FIG. 6 is a flow diagram 600 illustrating an example method for a mobile device to obtain a location context identifier based at least partly on information indicative of a location of a mobile device and to obtain location-based data based at least partly on a location context identifier according to an implementation. As illustrated, flow diagram 600 may include seven operational blocks 602-614. Although operations 602-614 are shown and described in a particular order, it should be understood that methods may be performed in alternative manners (including with a different number of operations) without departing from claimed subject matter. Also, at least some operations of flow diagram 600 may be performed so as to be fully or partially overlapping other operation(s). Additionally, although the description below references particular aspects and features illustrated in certain other figures (e.g., FIGS. 1-5), methods may be performed with other aspects and/or features.

For certain example implementations, operations 602-614 may be performed at least partially by a mobile device 102. At operation 602, signals comprising information indicative of a location of a mobile device may be obtained. For example, a mobile device 102 may obtain one or more signals 110 from at least one information source 106 with such signals 110 comprising information 108 indicative of a location of mobile device 102.

At operation 604, information indicative of a location of a mobile device may be transmitted to a positioning server according to predetermined contact information that is associated with the positioning server. For example, information 108 that is indicative of a location of a mobile device may be transmitted from a mobile device 102 over one or more networks 206 to a positioning server 202 according to predetermined contact information 208 that is associated with positioning server 202.

At operation 606, a location context identifier may be received at a mobile device responsive to transmission of information that is indicative of a location of the mobile device. For example, a location context identifier 204 may be received from a positioning server 202 at a mobile device 102 via one or more networks 206 responsive to a transmission to positioning server 202 of information 108 that is indicative of a location of the mobile device.

Additional data related to the providing of a location-based service may also be received at a mobile device from a server device in response to transmission of information that is indicative of a location of the mobile device. Such location-based data may be sent along with or separately from a location context identifier. Alternatively, a mobile device may submit a received location context identifier to a same server or to another server in order to receive such other/additional location-based data. Example implementations relating to receiving location-based data at a mobile device in response to transmitting a location context identifier are described herein above with particular reference to FIGS. 4-5 and additionally below with regard to operations 608-614.

Generally, a location context identifier corresponding to a localized environment in which a mobile device is located may be obtained. For example, a location context identifier 204 may be obtained by a mobile device 102 upon its entry to a localized environment 104. A location context identifier 204 may be obtained, by way of example but not limitation, in accordance with operations 602-606. As indicated by line 616, a mobile device 102 may interact with a different server in a context for operations 602-606 as compared to a context for operations 608-614. By way of example but not limitation, if a mobile device 102 interacts with more than a single server 114, a mobile device 102 may interact with a positioning server 202 when performing operations 602-606 and may interact with a location-based data server 402 when performing operations 608-614.

At operation 608, the location context identifier may be transmitted to a location-based data server according to predetermined contact information. For example, an obtained location context identifier 204 may be transmitted from a mobile device 102 to a location-based data server 402 over one or more networks 206 in accordance with predetermined contact information 406 that is associated with location-based data server 402, which predetermined contact information 406 may comprise at least part of location context identifier 204. At operation 610, location-based data may be received responsive to transmission of the location context identifier. For example, a mobile device 102 may receive location-based data 404 from a location-based data server 402 via one or more networks 206 responsive to transmission of location context identifier 204 by mobile device 102.

At operation 612, a location of a mobile device in a localized environment may be determined based at least partly on the received location-based data. For example, a current location of a mobile device 102 in a localized environment 104 may be determined based at least partly on received location-based data 404. For instance, a location of a mobile device 102 may be determined by such a mobile device based, at least in part, on one or more identified wireless access devices of a localized environment 104, a map of a localized environment 104 having associated routability information, signal heatmap data and/or models of a localized environment 104, position probability data of a localized environment 104, some combination thereof, and so forth, just to name a few examples. By way of another example, but not a limitation, a location of a mobile device 102 may be refined (e.g., a mobile device may refine a location by determining such a location to a greater degree of precision) using location-based data 404 that includes map information for localized environment 104.

At operation 614, at least one location-based service may be provided to a user of a mobile device based at least partly on the received location-based data. For example, at least one location-based service 112 may be provided to a user of a mobile device 102 based at least partly on received location-based data 404 (e.g., such as by using a location determined from received location-based data 404 in operation 612). Such a location-based service 112 may be provided at least partly via a display screen and/or a speaker of such a mobile device 102. Examples of location-based data 404 as well as location-based services 112 that may be provided based at least partly thereon are described herein below with particular reference to FIG. 8. Furthermore, a mobile device 102 may transmit a location context identifier 204 to a number of different servers and/or at a number of different times in order to receive different types of location-based data 404 and/or such data that is current at different times. Such location-based data 404 may be used for different location-based applications.

Figure 7:
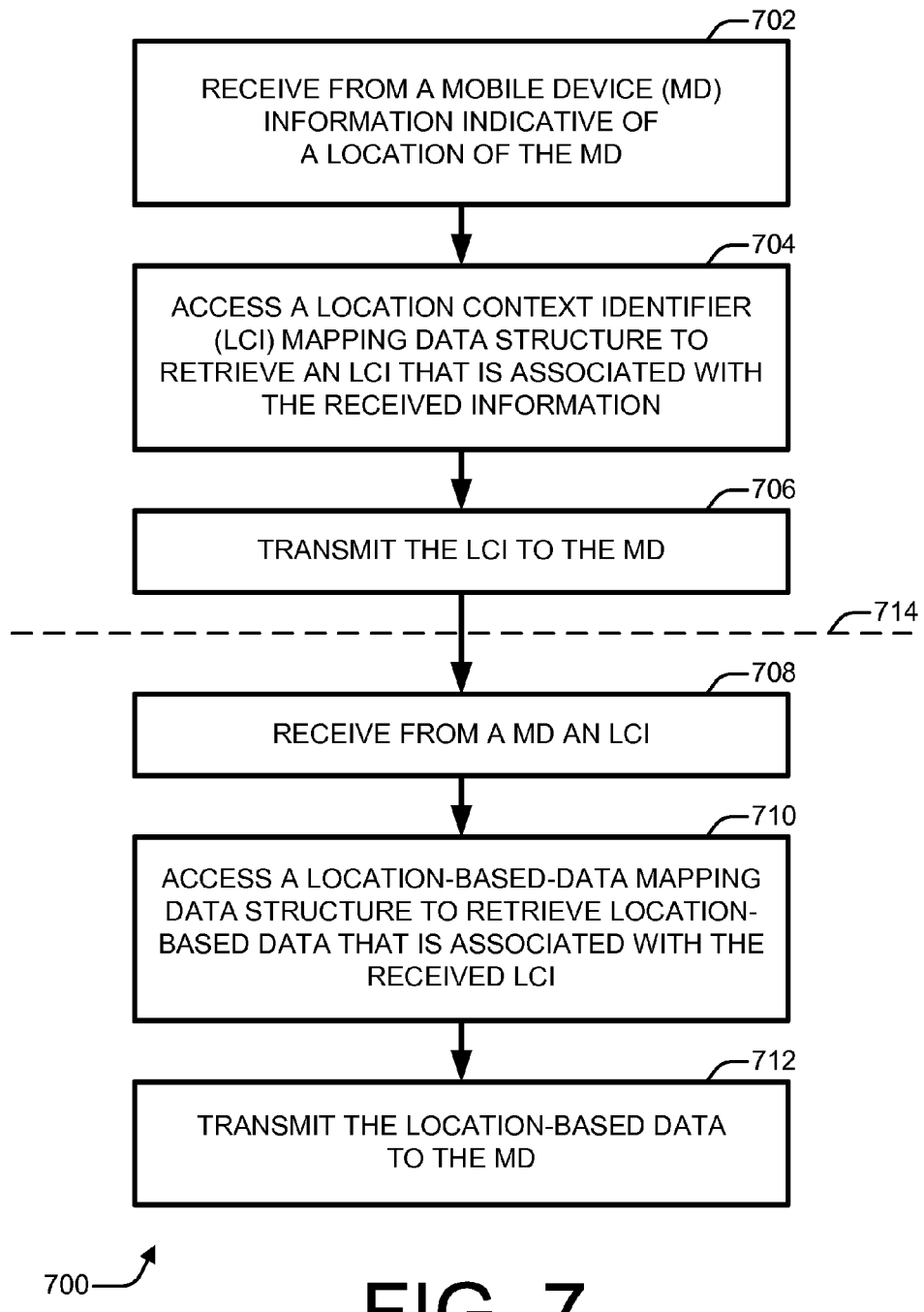
FIG. 7 is a flow diagram illustrating an example method for one or more servers (e.g., a positioning server and a location-based data server) to provide a location context identifier based at least partly on information indicative of a location of a mobile device and to provide location-based data based at least partly on a location context identifier according to an implementation.

FIG. 7 is a flow diagram 700 illustrating an example method for one or more servers (e.g., a positioning server and a location-based data server) to provide a location context identifier based at least partly on information indicative of a location of a mobile device and to provide location-based data based at least partly on a location context identifier according to an implementation. As illustrated, flow diagram 700 may include six operational blocks 702-712. Although operations 702-712 are shown and described in a particular order, it should be understood that methods may be performed in alternative manners (including with a different number of operations) without departing from claimed subject matter. Also, at least some operations of flow diagram 700 may be performed so as to be fully or partially overlapping other operation(s). Additionally, although the description below references particular aspects and features illustrated in certain other figures (e.g., FIGS. 1-5), methods may be performed with other aspects and/or features.

For certain example implementations, operations 702-712 may be performed at least partially by one or more servers (e.g., a positioning server 202 and/or a location-based data server 402). By way of example but not limitation, as indicated by line 714, if operations 702-712 are performed by more than a single server 114, operations 702-706 may be performed by a positioning server 202, and operations 708-712 may be performed by a location-based data server 402. At operation 702, information indicative of a location of a mobile device may be received from the mobile device. For example, information 108 that is indicative of a location of a mobile device 102 may be received from mobile device 102 at a positioning server 202 via one or more networks 206.

At operation 704, a location context identifier mapping data structure may be accessed to retrieve a location context identifier that is associated with received information that is indicative of a location of a mobile device. For example, positioning server 202 may access a location context identifier mapping data structure 302 at a particular association entry 304 with reference to particular information 108 that is indicative of a location of a mobile device 102. With such accessing, positioning server 202 may retrieve a particular location context identifier 204 that is associated with the particular information 108. At operation 706, the retrieved location context identifier may be transmitted to a mobile device. For example, a location context identifier 204 that is associated with received information 108 may be transmitted from a positioning server 202 to a mobile device 102 over one or more networks 206.

At operation 708, a location context identifier may be received from a mobile device at a location-based data server. For example, a location-based data server 402 may receive at least one location context identifier 204 from a mobile device 102 via one or more networks 206. At operation 710, a location-based-data mapping data structure may be accessed to retrieve location-based data that is associated with the received location context identifier. For example, a location-based data server 402 may access a location-based-data mapping data structure 502 to retrieve from an association entry 504 location-based data 404 that is associated with a received location context identifier 204. At operation 712, retrieved location-based data may be transmitted to a mobile device. For example, a location-based data server 402 may initiate transmission of retrieved location-based data 404 to a mobile device 102 over one or more networks 206.

Figure 8:
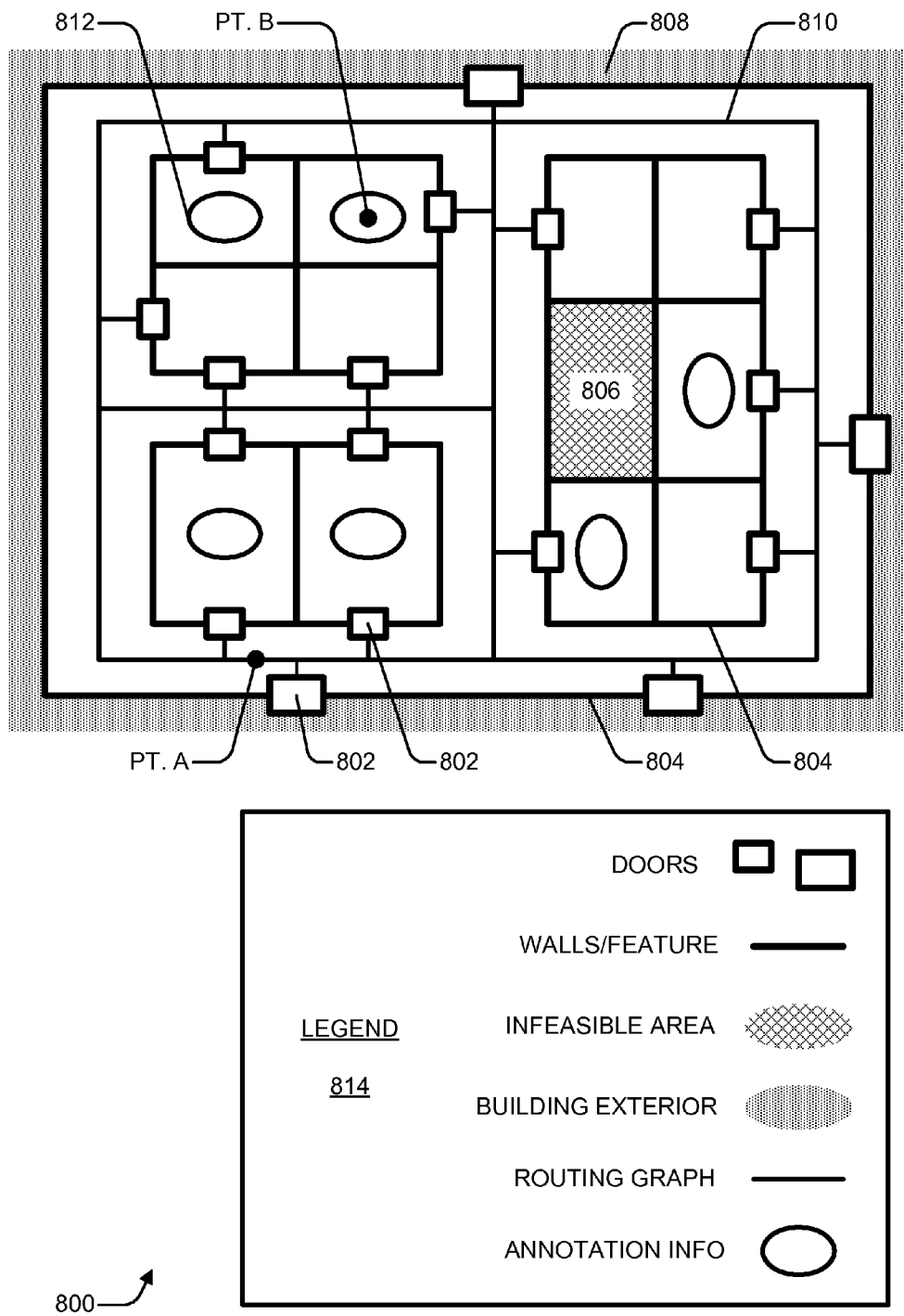
FIG. 8 is a schematic diagram of an example localized environment and associated map information according to an implementation.

FIG. 8 is a schematic diagram 800 of an example localized environment and associated map information according to an implementation. As illustrated, schematic diagram 800 includes a map of an indoor environment and a routing graph that has been created for the indoor environment. Indoor environments may include office buildings, apartment buildings, malls, airports, arenas, convention centers, stadiums, and so forth, just to name a few examples. An indoor environment may have walls, doors, columns, stairs, elevators, and so forth. These types of building features and other objects may restrict movement around an indoor environment. Indoor environments may also have open areas such as lobbies, common areas, entryways, rooms, and so forth, just to name few examples. Accordingly, because paths of movement for such an indoor environment may be restricted in some areas (although they may also be unrestricted in other, open areas), such an indoor environment may be an example of a constrained environment. More generally, a localized environment may further include, in addition to indoor environments, environments such as: apartment complexes; business, commercial, and/or industrial parks; resorts or other entertainment areas; and so forth, just to name a few examples.

For certain example implementations, map information, navigational information, etc. may be provided as location-based data. Map information, which may include a routing graph with linked or otherwise associated annotation information, may be used to provide navigational information. Navigational information may include, by way of example but not limitation, positioning information, directional information, turn-by-turn directions, and so forth. Such navigational information may facilitate travel from a point "A" to a point "B". By way of example but not limitation, a routing graph with associated annotation information may be descriptive of feasible areas of a given map and indicate how traversal is possible from one position to another position (e.g., to one or more potential destinations). Such a routing graph and/or associated annotation information may comprise an example of routability information. For any given building, a routing graph may comprise a set of nodes and edges that depict feasible areas and traversable paths from one point in a building to another point. A traversable path may comprise, by way of example but not limitation, a path between any two points that is not blocked by a wall or other obstacle. Feasibility information may comprise, by way of example but not limitation, information indicating or otherwise identifying whether a particular zone, space, room, or other location is accessible.

As shown in example schematic diagram 800, an example routing graph 810 has been created that may include linkages to annotation information 812 from building information that is descriptive of at least a portion of a building structure. Such building information may comprise data that is in any format. Building information may comprise a computer aided design (CAD) file, a drawing interchange format (DXF) file, an image file, some combination thereof, and so forth, just to name a few examples.

As illustrated, schematic diagram 800 may include external/internal doors 802, exterior/interior walls 804, at least one infeasible area 806, a building exterior area 808, a routing graph 810, and annotation information 812. Using routing graph 810, a navigational application and/or system may provide directional instructions for an individual to travel, for instance, from point "A" to point "B". Although all such illustrated features are not explicitly denoted with reference numerals in FIG. 8 for the sake of visual clarity, a legend 814 indicates which building and navigational features are connoted by which particular drawing features. Also, although schematic diagram 800 generally and routing graph 810 specifically may include certain example components as illustrated in FIG. 8 and described herein below, claimed subject matter is not so limited. Instead, given implementations may include more, fewer, and/or different components. For example, building information may omit door indications. Also, infeasible areas may not be identified. Furthermore, additional annotation information and/or additional types of such information may be linked to routing graph 810. Other alternatives and alternative components may be added, incorporated, omitted, changed, and so forth without deviating from claimed subject matter.

By way of example but not limitation, routing graph 810 may be indicative of a routing topology. Routing graph 810 may be retrieved or received (e.g., from memory, from a remote location, etc.) and/or created so as to correspond to a building structure of schematic diagram 800. In an example implementation, a routing graph 810 may be received as comprising at least part of location-based data 404 (of FIGS. 4 and 5). To create a routing graph 810, a grid of points may be applied to building information. The building information may be explored using such an applied grid of points. By way of example but not limitation, possible locations on a map may be represented using a discrete set of grid points. This discreteness need not present a problem for an accuracy of an overall system because a granularity of an applied grid of points may be increased so as to exceed a desired level of precision.

As part of an example exploration of building information, autonomous areas may be determined. Autonomous areas may include rooms, hallways, a building exterior, and so forth, just to name a few examples. At least one autonomous area may be ascertained to comprise a building exterior area 808. One or more other autonomous areas may be determined to comprise an infeasible area 806. For example, an area without a door and/or an area without annotation information may be determined to be infeasible. On the other hand, autonomous areas that are reachable and/or that are associated with annotation information may be determined to comprise feasible areas (e.g., accessible rooms, stores, hallways, etc.).

If doors are indicated in building information, one or more external doors 802 (e.g., the larger door rectangles in FIG. 8 representing exits and/or entrances for a building structure) may be determined if such door(s) connect to and provide access to building exterior area 808. One or more internal doors 802 (e.g., the smaller door rectangles in FIG. 8) may be determined to provide access to other feasible areas, such as internal rooms, hallways, and so forth.

Annotation information 812 may be linked to routing graph 810 to further enable navigational aid between and/or among different areas (e.g., rooms, zones, etc.) and/or another location-based service. Annotation information 812 may also provide information associated with a particular zone, such a lobby, an elevator bank, a dining location, and so forth, just to name a few examples. By way of example but not limitation, annotation information 812 may include room designations (e.g., "A", "1.24", etc.), room names (e.g., "Conference Room 1", etc.), room purposes, (e.g., "Bathroom", "Kitchen", etc.), room residents or occupants (e.g., "Amy", "Ray", etc.), zone exhibitors (e.g., "Acme", "AA Industrializing", etc.), store owners (e.g., "Rugs-R-Us", "Nicky's Nick-Knacks", etc.), and so forth.

Routability information may comprise, for example, information that is capable of aiding and/or facilitating a determination of a route. By way of example but not limitation, routability information may include any one or more of the following: a routing graph 810, annotation information 812 (e.g., that is linked to a routing graph 810), general building information, indication(s) of feasible and infeasible areas, indications of traversable paths, any combination thereof, and so forth, just to name a few examples. A routing graph 810 may be used to plot a path from one point to another point, including from one annotated area or zone to another annotated area or zone. Map information may comprise routability information, building information, any portion or combination thereof, and so forth, just to name a few examples. By way of example but not limitation, map information may comprise a map with or without points of interest (from which a routing graph may be created), a routing graph and associated annotation information (from which a route to a point of interest may be determined), some combination thereof, and so forth. By way of example but not limitation, location-based data 404 may comprise map information (e.g., information depicting features of a localized environment), annotation information 812, at least one routing graph 810, any combination thereof, and so forth. Location-based data 404 may also and/or alternatively include, by way of example but not limitation, at least one reference from a local coordinate system, which corresponds to a localized environment 104, to a global coordinate system (e.g., to enable and/or implement georeferencing).

As described herein above, a mobile device 102 may request location-based data 404 with a location context identifier 204. A request may be for all available location-based data or a portion thereof, such as one or more layers of information. By way of example but not limitation, a mobile device may obtain one or more point of interest layers for a current location context from a location-based data server, such as a point of interest server. One example layer may comprise a topological graph representation, which may include nodes and/or links. Another example layer may comprise a first type of annotation information. Yet another example layer may comprise a second type of annotation information. Still yet another example layer may comprise a routing graph to enable routes to be determined between and/or among different items of annotation information. Other layers may alternatively be implemented without departing from claimed subject matter.

Using a location context identifier 204, a mobile device 102 may request additional location-based data 404 information corresponding to the location context identifier. Six example items that may be retrieved from a location-based data server 402, such as a point of interest server, are described here. First, a routing topology (e.g., a link/node representation) of a localized environment such as an indoor locale may be retrieved. Second, an indication of which discrete points, or sets thereof, are feasible versus infeasible may be received for a map of a localized environment. Third, orientation information may be indicated by a vector drawn in a specific direction (e.g., due north). Fourth, information about global coordinates and/or certain landmark points of interest whose local coordinates are known may be received. Fifth, information about the location of "special" portals such as elevators and staircases may be retrieved. Sixth, an indication of shortest distance routing costs as well as starting and ending direction vectors from any point to any other proximate point may be obtained from a location-based data server. Such information may be used by a positioning engine (e.g., running at a mobile device). Additional and/or alternative point of interest layers specifying entities at various points on a localized map may be retrieved from one or more servers using at least one location context identifier without departing from claimed subject matter.

In an example implementation, after receiving multiple portions, types, layers, etc. of location-based data, a mobile device may combine them into a "mashup". Such a mashup may be searched for a specific point of interest, which may be selected as a designated destination. A list of points of interest may become further searchable in a mobile device that includes a search nearby function (e.g., a function to search near a current position). Such a search may be constrained based on local coordinates and/or global coordinates. A listing of points of interest that are linked to a map may be considered an example of an annotation layer for a map. Multiple service providers may create their own annotations for a given localized environment by creating separate map information files, by creating separate layers for one map information file, by combining annotation information into a single layer for one map information file, and so forth, just to name a few examples. Such personalized annotations may also and/or alternatively be retrieved as location-based data 404 using a location context identifier 204.

In an example implementation, routing to a designated destination may be calculated and presented to a user. A routing may be presented graphically (e.g., laid over a map), with words (e.g., visually and/or aurally), some combination thereof, and so forth, just to name a couple of examples. Given a current position in either local or global coordinates, a shortest path routing algorithm, for example, may be applied to a routing graph to determine a route to be presented to a user. However, other routing algorithms may alternatively be applied to a routing graph to determine a route without deviating from claimed subject matter. By way of example but not limitation, a user may be located at point "A" (of FIG. 8) and designate a point of interest corresponding to point "B" as a desired destination. A route over routing graph 810 may be determined and presented to a user. A resulting navigation graph may also be embedded into map information and modeled as an annotation layer with nodes and edges of the route being considered points of interest in an annotation layer.

In an example route determination scenario, an end point or destination may be designated by a user. A user's current location may be annotated as a starting location. Users may also be enabled to choose a starting location in order to facilitate routing. From a starting point, a nearest k map nodes (e.g., with k being a non-zero integer) may be obtained as starting location(s) for a route determination. For a case in which a user is in a room with only one exit, a nearest map node may be defined to be a door to that room. If a user is already in a hallway, a nearest node or nearest nodes may be the closest hallway intersection points. However, a nearest map node or nearest map nodes may be determined in alternative manners.

A shortest path algorithm, for example, may be applied to generate a path from a point of origination to a designated destination. A user may have multiple first node options, such as from a room having two exit doors or from a hallway position having multiple nearby intersections. In cases such as these, a routing algorithm may be applied to each of these origination or starting points, and a shortest resulting path may be selected as a route to present to a user. Similarly, if a designated destination has multiple node options, multiple path permutations may be calculated and considered for presentation to a user.

In cases in which multiple floors of a localized environment are supported, a node framework may be extended to cover elevators and stairwells. For example, elevators may be characterized as nodes with edges to each floor to which the elevator has access. Similarly, stairwells may be marked as intersections with nodes such that each stairwell is connected to a stairwell immediately above and below.

Figure 9:
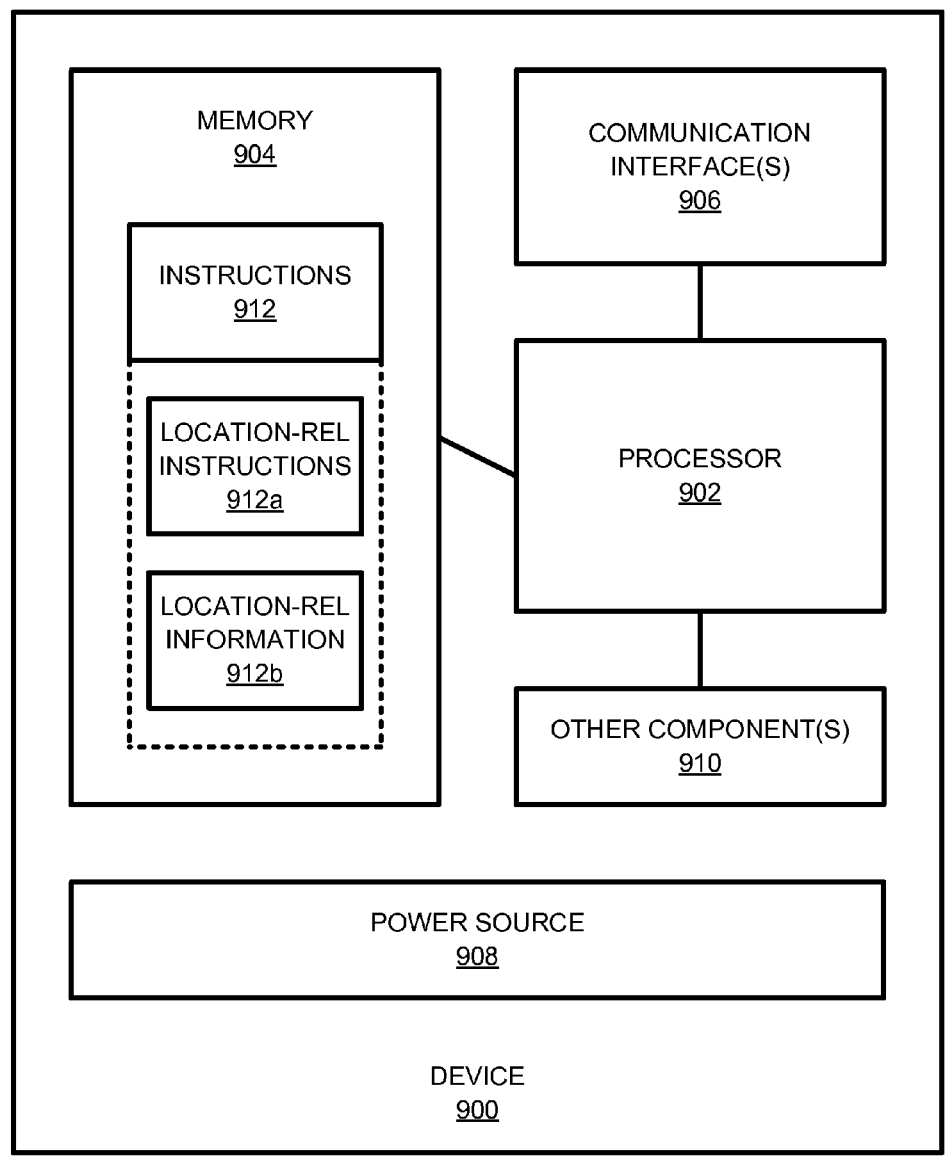
FIG. 9 is a schematic diagram illustrating an example device, according to an implementation, that may implement one or more aspects of mobile device locating in conjunction with localized environments.

FIG. 9 is a schematic diagram illustrating an example device 900, according to an implementation, that may implement one or more aspects of mobile device locating in conjunction with localized environments. As illustrated, device 900 may include at least one processor 902, one or more memories 904, at least one communication interface 906, at least one power source 908, and other component(s) 910, such as an SPS unit (SPSU) (not explicitly shown). Memory 904 is illustrated as including instructions 912. However, a device 900 may alternatively include more, fewer, and/or different components from those that are illustrated without deviating from claimed subject matter.

For certain example implementations, device 900 may include and/or comprise at least one electronic device. Device 900 may comprise, for example, any electronic device having at least one processor and/or memory. Examples for device 900 include, but are not limited to, relatively fixed processing devices (e.g., a desktop computer, one or more server computers, at least one telecommunications node, an intelligent router/switch, an access point, some combination thereof, etc.), relatively mobile processing devices (e.g., a notebook computer, a personal digital assistant (PDA), a netbook, a slate or tablet computer, a portable entertainment device, a mobile phone, a smart phone, a mobile station, some combination thereof, etc.), and so forth.

Power source 908 may provide power to components and/or circuitry of device 900. Power source 908 may be a portable power source, such as a battery, or a fixed power source, such as an outlet or other conduit in a car, house, or other building to a public utility power source. Power source 908 may also be a transportable power source, such as a solar or carbon-fuel-based generator. Power source 908 may be integrated with or separate from device 900.

Processor 902 may comprise any one or more processing units. Memory 904 may store, contain, or otherwise provide access to instructions 912 (e.g., a program, an application, etc. or portion thereof; operational data structures; processor-executable instructions; code; some combination thereof; and so forth) that may be executable by processor 902. A processor 902 may be configured to execute instructions 912 if processor 902 has access to instructions 912 and/or if processor 902 is executing instructions 912. Execution of such instructions 912 by one or more processors 902 may transform device 900 into a special-purpose computing device, apparatus, platform, some combination thereof, and so forth.

Instructions 912 may include location-related instructions 912a, location-related information 912b, and so forth, just to name a few examples. In certain example mobile device implementations, location-related instructions 912a may correspond to, for example, instructions that are capable of realizing at least a portion of one or more implementations of flow diagram 600 (of FIG. 6), such as any one or more of operations 602-614. Location-related information 912b may comprise any information facilitating, enabling, or otherwise relating to mobile device locating in conjunction with localized environments with regard to mobile devices. Location-related information 912b may include, but is not limited to, information 108 that is indicative of a location of the mobile device, a received location context identifier 204, location-based data 404, any combination thereof, and so forth.

In certain example server (e.g., positioning server and/or location-based data server) implementations, location-related instructions 912a may correspond to, for example, instructions that are capable of realizing at least a portion of one or more implementations of flow diagram 700 (of FIG. 7), such as any one or more of operations 702-712. Location-related information 912b may comprise any information facilitating, enabling, or otherwise relating to mobile device locating in conjunction with localized environments with regard to positioning servers and/or location-based data servers. Location-related information 912b may include, but is not limited to, received information 108 that is indicative of a location of the mobile device, a retrieved location context identifier 204, a location context identifier mapping data structure 302, location-based data 404, a location-based-data mapping data structure 502, any combination thereof, and so forth. Although not explicitly shown, instructions 912 may also include instructions to modify or create location-based data 404 (e.g., including, but not limited to, with regard to a server implementation), to utilize location-based data 404 to provide location-based services 112 (e.g., including, but not limited to, with regard to a mobile device implementation), and so forth, just to name a few examples.

In an example implementation, a relatively fixed processing device, such as a server and/or telecommunications node, may execute location-related instructions 912a to return a location context identifier 204 in response to receiving information 108 that is indicative of a location of a mobile device. A same or a different relatively fixed processing device may return location-based data 404 in response to receiving information 108 and/or a location context identifier 204 from a mobile device. Location-based data 404 may be provided to a mobile device to enable or otherwise further performance of some location-based service 112. As still another alternative, a mobile device may execute location-related instructions 912a to provide a location-based service 112 to a user based at least partly on location-related information 912b, which may include a routing graph and/or other map information. Other alternatives may instead be implemented without departing from claimed subject matter.

Communication interface(s) 906 may provide one or more interfaces between device 900 and other devices (e.g., and/or human operators). Hence, communication interface 906 may include a screen, speaker, keyboard or keys, or other human-device input/output feature(s). Communication interface 906 may include a transceiver (e.g., transmitter and/or receiver), a radio, an antenna, a wired interface connector or other such apparatus, some combination thereof, etc. to communicate wireless and/or wired signals (e.g., over wireless or wired communication links). Such communications with at least one communication interface 906 may enable transmitting, receiving, initiating of transmissions, and so forth, just to name a few examples. Communication interface 906 may also serve as a bus or other interconnect between and/or among other components of device 900. Other component(s) 910, if present, may comprise one or more other miscellaneous sensors, features, and so forth.

Methodologies described herein may be implemented by various means depending upon applications according to particular features and/or examples. For example, such methodologies may be implemented in hardware, firmware, software, discrete/fixed logic circuitry, any combination thereof, and so forth. In a hardware and/or logic circuitry implementation, for example, a processor/processing unit may be implemented within one or more application specific integrated circuits (ASICs), digital signal processors (DSPs), digital signal processing devices (DSPDs), programmable logic devices (PLDs), field programmable gate arrays (FPGAs), processors generally, controllers, micro-controllers, microprocessors, electronic devices, other devices or units programmed to execute instructions and/or designed to perform the functions described herein, and/or combinations thereof, just to name a few examples. Herein, the term "control logic" may encompass logic implemented by software, hardware, firmware, discrete/fixed logic circuitry, any combination thereof, and so forth.

For a firmware and/or software implementation, the methodologies may be implemented with modules (e.g., procedures, functions, etc.) having instructions that perform the functions described herein. Any machine readable medium tangibly embodying instructions may be used in implementing the methodologies described herein. For example, software coding may be stored in a memory and executed by a processor. Memory may be implemented within the processor or external to the processor. As used herein the term "memory" refers to any type of long term, short term, volatile, nonvolatile, or other storage memory/medium and is not to be limited to any particular type of memory or number of memories, or type of media upon which memory is stored.

In one or more example implementations, the functions described may be implemented in hardware, software, firmware, discrete/fixed logic circuitry, some combination thereof, and so forth. If implemented in firmware and/or software, the functions may be stored on a physical computer-readable (e.g., via electrical digital signals) medium as one or more instructions or code. Computer-readable media include physical computer storage media that may be encoded with a data structure, computer program, a combination thereof, and so forth. A storage medium may be any available physical medium that can be accessed by a computer.

By way of example, and not limitation, such computer-readable media can comprise RAM, ROM, EEPROM, CD-ROM or other optical disc storage, magnetic disk storage or other magnetic storage devices, or any other medium that can be used to store desired program code in the form of instructions or data structures and that can be accessed by a computer and/or processor thereof. Disk and disc, as used herein, includes compact disc (CD), laser disc, optical disc, digital versatile disc (DVD), floppy disk and blu-ray disc, where disks usually reproduce data magnetically, while discs usually reproduce data optically with lasers.

Also, computer instructions/code/data may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions and/or data may be transmitted in portions (e.g., first and second portions) at different times (e.g., at first and second times).

Electronic devices may also operate in conjunction with Wi-Fi/WLAN or other wireless networks. For example, positioning data may be acquired via a Wi-Fi or other wireless network. In addition to Wi-Fi/WLAN signals, a wireless/mobile device may also receive signals from satellites, which may be from a Global Positioning System (GPS), Galileo, GLONASS, NAVSTAR, QZSS, a system that uses satellites from a combination of these systems, or any SPS developed in the future, each referred to generally herein as a Satellite Positioning System (SPS) or GNSS (Global Navigation Satellite System). Furthermore, implementations described herein may be used with positioning determination systems that utilize pseudolites or a combination of satellites and pseudolites. Pseudolites are usually ground-based transmitters that broadcast a Pseudo-Random Noise (PRN) code or other ranging code (e.g., similar to a GPS or CDMA cellular signal) that is modulated on an L-band (or other frequency) carrier signal, which may be synchronized with GPS time. Each such transmitter may be assigned a unique PN code so as to permit identification by a remote receiver. Pseudolites may be particularly useful in situations where SPS signals from an orbiting satellite might be unavailable, such as in tunnels, mines, buildings, urban canyons, or other enclosed areas. Another implementation of pseudolites is known as radio-beacons. The term "satellite", as used herein, is also to include pseudolites, equivalents of pseudolites, and similar and/or analogous technologies. The term "SPS signals", as used herein, is also to include SPS-like signals from pseudolites or equivalents of pseudolites. Certain implementations may also be applied to femtocells or a combination of systems that includes femtocells. For example, femtocells may provide data and/or voice communication. Moreover, femtocells may provide positioning data.

In an example implementation, an SPSU (when present) may be capable of determining a location of device 900 using an SPS system or systems. Hence, example implementations that are described herein may be used with various SPSs. An SPS typically includes a system of transmitters positioned to enable entities to determine their location on or above the Earth based, at least in part, on signals received from the transmitters. Such a transmitter typically, but not necessarily, transmits a signal marked with a repeating pseudo-random noise (PN) code of a set number of chips and may be located on ground based control stations, user equipment, and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals may include SPS, SPS-like, and/or other signals associated with such one or more SPS.

Some portions of this Detailed Description are presented in terms of algorithms or symbolic representations of operations on binary digital signals that may be stored within a memory of a specific apparatus or special purpose computing device or platform. In the context of this particular Specification, the term specific apparatus or the like includes a general purpose computer once it is programmed to perform particular functions pursuant to instructions from program software/instructions. Algorithmic descriptions or symbolic representations are examples of techniques used by those of ordinary skill in the signal processing or related arts to convey the substance of their work to others skilled in the art. An algorithm here, and generally, may be considered to be a self-consistent sequence of operations or similar signal processing leading to a desired result. In this context, operations or processing involve physical manipulation of physical quantities. Typically, although not necessarily, such quantities may take the form of electrical and/or magnetic signals capable of being stored, transferred, combined, compared, transmitted, received, or otherwise manipulated.

It has proven convenient at times, principally for reasons of common usage, to refer to such signals as bits, data, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "obtaining," "transmitting," "receiving," "performing," "applying," "positioning/locating," "measuring," "accessing," "retrieving," "providing," "detecting," "selecting," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, and/or magnetic quantities within memories, registers, or other information storage devices, transmission devices, or display devices of the special purpose computer or similar special purpose electronic computing device.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concepts described herein. Therefore, it is intended that claimed subject matter not be limited to the particular examples disclosed, but that such claimed subject matter may also include all aspects falling within the scope of appended claims, and equivalents thereof.

What is claimed is:

1. A method of determining a location of a mobile device comprising:
   obtaining at the mobile device one or more signals comprising information indicative of a location of the mobile device;
   wirelessly transmitting, by the mobile device, the information indicative of the location of the mobile device to a first server;
   wirelessly receiving, by the mobile device from the first server, in response to said transmitting of the information indicative of the location of the mobile device, location context identifiers corresponding to a localized environment at which the mobile device is located, the received location context identifiers associated with the information indicative of the location of the mobile device wherein the received location context identifiers comprise a first location context identifier and a second location context identifier, the first location context identifier being different from the second location context identifier;
   wirelessly transmitting, by the mobile device, the received location context identifiers to a second server;
   wirelessly receiving, by the mobile device from the second server, location-based data, responsive to said transmitting of the received location context identifiers, the location based data corresponding to the localized environment at which the mobile device is located and comprising a map of the localized environment wherein the location based data comprises first location based data associated with the first location context identifier and second location based data associated with the second location context identifier, the first location-based data being different from the second location-based data; and
   determining the location of the mobile device, by the mobile device, based at least in part upon the location-based data.

2. The method of claim 1 further comprising combining, by the mobile device, the first location-based data and the second location-based data into a searchable mashup.

3. The method of claim 1 wherein the first server and the second server are a same server.

4. The method of claim 1 wherein the first server is a positioning server and wherein the second server is a location-based data server.

5. The method of claim 1 wherein the location-based data further comprises layers of information and wherein wirelessly transmitting the received location context identifiers includes wirelessly transmitting a request for a portion of the layers of information.

6. The method of claim 1 wherein the map of the localized environment further comprises one or more of routability information, signal heat map data, portal information, points of interest, annotation information, position probability data, or access point information.

7. The method of claim 6 wherein the routability information comprises one or more of a routing graph, annotation information, general building information, feasibility indications, shortest path information, or traversable path information.

8. The method of claim 1, wherein the localized environment comprises an indoor environment corresponding to at least a portion of a building structure in which the mobile device is located.

9. The method of claim 1, wherein the location-based data comprises at least one reference from a local coordinate system, which corresponds to the localized environment, to a global coordinate system.

10. A mobile device comprising:
    at least one memory to store instructions; and
    one or more processors configured to execute said instructions and render the mobile device to be configured to perform operations comprising:
      obtaining at the mobile device one or more signals comprising information indicative of a location of the mobile device;
      wirelessly transmitting the information indicative of the location of the mobile device to a first server;
      wirelessly receiving, by the mobile device from the first server, in response to said transmitting of the information indicative of the location of the mobile device, location context identifiers corresponding to a localized environment at which the mobile device is located, the received location context identifiers associated with the information indicative of the location of the mobile device wherein the received location context identifiers comprise a first location context identifier and a second location context identifier, the first location context identifier being different from the second location context identifier;

wirelessly transmitting the received location context identifiers to a second server;

wirelessly receiving, by the mobile device from the second server, location-based data, responsive to said transmitting of the received location context identifiers, the location based data corresponding to the localized environment at which the mobile device is located and comprising a map of the localized environment wherein the location based data comprises first location based data associated with the first location context identifier and second location based data associated with the second location context identifier, the first location-based data being different from the second location-based data; and determining the location of the mobile device, by the mobile device, based at least in part upon the location-based data.

11. The mobile device of claim 10 wherein the one or more processors are further configured to execute further instructions and further render the mobile device to be configured to perform further operations comprising:

combining, by the mobile device, the first location-based data and the second location-based data into a searchable mashup.

12. The mobile device of claim 10 wherein the first server and the second server are a same server.

13. The mobile device of claim 10 wherein the first server is a positioning server and wherein the second server is a location-based data server.

14. The mobile device of claim 10 wherein the location-based data further comprises layers of information and wherein the one or more processors are further configured to execute said instructions and render the mobile device the special computing device to wirelessly transmit a request for a portion of the layers of information.

15. The mobile device of claim 10 wherein the map of the localized environment further comprises one or more of routability information, signal heat map data, portal information, points of interest, annotation information, position probability data, or access point information.

16. The mobile device of claim 15 wherein the routability information comprises one or more of a routing graph, annotation information, general building information, feasibility indications, shortest path information, or traversable path information.

17. The mobile device of claim 10, wherein the localized environment comprises an indoor environment corresponding to at least a portion of a building structure in which the mobile device is located.

18. The mobile device of claim 10, wherein the location-based data comprises at least one reference from a local coordinate system, which corresponds to the localized environment, to a global coordinate system.

19. A mobile device comprising:

means for obtaining at the mobile device one or more signals comprising information indicative of a location of the mobile device;

means for wirelessly transmitting, by the mobile device, the information indicative of the location of the mobile device to a first server;

means for wirelessly receiving, by the mobile device from the first server, in response to said transmitting of the information indicative of the location of the mobile device, location context identifiers corresponding to a localized environment at which the mobile device is located, the received location context identifiers associated with the information indicative of the location of the mobile device wherein the received location context identifiers comprise a first location context identifier and a second location context identifier, the first location context identifier being different from the second location context identifier;

means for wirelessly transmitting, by the mobile device, the received location context identifiers to a second server;

means for wirelessly receiving, by the mobile device from the second server, location-based data, responsive to said transmitting of the received location context identifiers, the location based data corresponding to the localized environment at which the mobile device is located and comprising a map of the localized environment wherein the location based data comprises first location based data associated with the first location context identifier and second location based data associated with the second location context identifier, the first location-based data being different from the second location-based data; and means for determining the location of the mobile device, by the mobile device, based at least in part upon the location-based data.

20. The mobile device of claim 19 further comprising means for combining, by the mobile device, the first location-based data and the second location-based data into a searchable mashup.

21. The mobile device of claim 19 wherein the first server and the second server are a same server.

22. The mobile device of claim 19 wherein the first server is a positioning server and wherein the second server is a location-based data server.

23. The mobile device of claim 19 wherein the location-based data further comprises layers of information and wherein the means for wirelessly transmitting the received location context identifiers includes means for wirelessly transmitting a request for a portion of the layers of information.

24. The mobile device of claim 19 wherein the map of the localized environment further comprises one or more of routability information, signal heat map data, portal information, points of interest, annotation information, position probability data, or access point information.

25. The mobile device of claim 24 wherein the routability information comprises one or more of a routing graph, annotation information, general building information, feasibility indications, shortest path information, or traversable path information.

26. The mobile device of claim 19, wherein the localized environment comprises an indoor environment corresponding to at least a portion of a building structure in which the mobile device is located.

27. The mobile device of claim 19, wherein the location-based data comprises at least one reference from a local coordinate system, which corresponds to the localized environment, to a global coordinate system.

28. An article comprising at least one storage medium having stored thereon instructions executable by one or more processors to:

obtain at a mobile device one or more signals comprising information indicative of a location of the mobile device;

wirelessly transmit, by the mobile device, the information indicative of the location of the mobile device to a first server;

wirelessly receive, by the mobile device from the first server, in response to said transmitting of the information indicative of the location of the mobile device, location context identifiers corresponding to a localized environment at which the mobile device is located, the received location context identifiers associated with the information indicative of the location of the mobile device wherein the received location context identifiers comprise a first location context identifier and a second location context identifier, the first location context identifier being different from the second location context identifier;

wirelessly transmit, by the mobile device, the received location context identifiers to a second server;

wirelessly receive, by the mobile device from the second server, location-based data, responsive to said transmitting of the received location context identifiers, the location based data corresponding to the localized environment at which the mobile device is located and comprising a map of the localized environment wherein the location based data comprises first location based data associated with the first location context identifier and second location based data associated with the second location context identifier, the first location-based data being different from the second location-based data; and determine the location of the mobile device, by the mobile device, based at least in part upon the location-based data.

29. The article of claim 28 wherein the instructions executable by the one or more processors further comprise instructions to combine, by the mobile device, the first location-based data and the second location-based data into a searchable mashup.

30. The article of claim 28 wherein the first server and the second server are a same server.

31. The article of claim 28 wherein the first server is a positioning server and wherein the second server is a location-based data server.

32. The article of claim 28 wherein the location-based data further comprises layers of information and wherein the instructions executable by the one or more processors to wirelessly transmit the received location context identifiers include instructions to wirelessly transmit a request for a portion of the layers of information.

33. The article of claim 28 wherein the map of the localized environment further comprises one or more of routability information, signal heat map data, portal information, points of interest, annotation information, position probability data, or access point information.

34. The article of claim 33 wherein the routability information comprises one or more of a routing graph, annotation information, general building information, feasibility indications, shortest path information, or traversable path information.

35. The article of claim 28, wherein the localized environment comprises an indoor environment corresponding to at least a portion of a building structure in which the mobile device is located.

36. The article of claim 28, wherein the location-based data comprises at least one reference from a local coordinate system, which corresponds to the localized environment, to a global coordinate system.

* * * * *